US012786458B2

(12) United States Patent
Park

(10) Patent No.: US 12,786,458 B2
(45) Date of Patent: Nov. 3, 2026

(54) METHOD AND APPARATUS FOR ENCODING/DECODING IMAGE, AND RECORDING MEDIUM HAVING BITSTREAM STORED THEREIN

(71) Applicant: LG Electronics Inc., Seoul (KR)

(72) Inventor: Naeri Park, Seoul (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 18/696,800

(22) PCT Filed: Sep. 30, 2022

(86) PCT No.: PCT/KR2022/014803

§ 371 (c)(1),
(2) Date: Mar. 28, 2024

(87) PCT Pub. No.: WO2023/055191

PCT Pub. Date: Apr. 6, 2023

(65) Prior Publication Data

US 2024/0397080 A1 Nov. 28, 2024

(30) Foreign Application Priority Data

Sep. 30, 2021 (KR) ........................ 10-2021-0130167

(51) Int. Cl.

| | |
|---|---|
| ***G06K 9/36*** | (2006.01) |
| ***H04N 19/132*** | (2014.01) |
| ***H04N 19/139*** | (2014.01) |
| ***H04N 19/167*** | (2014.01) |
| ***H04N 19/176*** | (2014.01) |

(Continued)

(52) U.S. Cl.

CPC ........... *H04N 19/52* (2014.11); *H04N 19/132* (2014.11); *H04N 19/139* (2014.11);

(Continued)

(58) Field of Classification Search

CPC .... H04N 19/52; H04N 19/132; H04N 19/139; H04N 19/167; H04N 19/176;

(Continued)

(56) References Cited

U.S. PATENT DOCUMENTS

| | | | | |
|---|---|---|---|---|
| 2019/0141333 | A1* | 5/2019 | Lee ........................ | H04N 19/52 |
| 2020/0112733 | A1 | 4/2020 | Li et al. | |
| 2022/0256165 | A1 | 8/2022 | Jang et al. | |

FOREIGN PATENT DOCUMENTS

| | | |
|---|---|---|
| KR | 20210006304 | 1/2021 |
| KR | 20210006306 | 1/2021 |

(Continued)

OTHER PUBLICATIONS

Extended European Search Report in European Appln. No. 22876962.6, mailed on Jul. 11, 2025, 15 pages.

(Continued)

*Primary Examiner* — Duy M Dang

(74) *Attorney, Agent, or Firm* — Fish & Richardson P.C.

(57) ABSTRACT

A method and an apparatus for decoding/encoding an image, according to the present disclosure, may: acquire a first flag indicating whether symmetric motion vector difference is used for a current block; acquire a control point vector difference of the current block on the basis of the first flag; derive a control point vector of the current block on the basis of the control point vector difference; derive a motion vector of the current block on the basis of the control point vector; and generate a prediction sample of the current block by using the motion vector.

14 Claims, 10 Drawing Sheets

(51) Int. Cl.
*H04N 19/463* (2014.01)
*H04N 19/52* (2014.01)

(52) U.S. Cl.
CPC ......... *H04N 19/167* (2014.11); *H04N 19/176* (2014.11); *H04N 19/463* (2014.11)

(58) Field of Classification Search
CPC .. H04N 19/463; H04N 19/105; H04N 19/109; H04N 19/119; H04N 19/124; H04N 19/186; H04N 19/44; H04N 19/513; H04N 19/54; H04N 19/70; H04N 19/423; G06T 9/004; G06T 7/20; G06T 7/207; G06T 7/215; G08B 13/19602; G06F 16/786
See application file for complete search history.

(56) References Cited

FOREIGN PATENT DOCUMENTS

| | | | |
|---|---|---|---|
| KR | 20210100195 | | 8/2021 |
| WO | WO2020/184958 | | 9/2020 |
| WO | WO2020/184964 | | 9/2020 |
| WO | 2020/251339 | A1 | 12/2020 |

OTHER PUBLICATIONS

International Search Report and Written Opinion in International Appln. No. PCT/KR2022014803, mailed on Jan. 20, 2023, 5 pages (with English translation).

* cited by examiner

METHOD AND APPARATUS FOR ENCODING/DECODING IMAGE, AND RECORDING MEDIUM HAVING BITSTREAM STORED THEREIN

CROSS-REFERENCE TO RELATED APPLICATIONS

This application is a National Stage application under 35 U.S.C. § 371 of International Application No. PCT/KR2022/014803, filed on Sep. 30, 2022, which claims the benefit of Korean Application No. 10-2021-0130167, filed on Sep. 30, 2021. The disclosures of the prior applications are incorporated by reference in their entirety.

TECHNICAL FIELD

The present disclosure relates to an image encoding/decoding method and device, and a recording medium storing a bitstream, and more particularly, relates to an image encoding/decoding method and device using affine prediction, and a recording medium storing a bitstream.

BACKGROUND

Recently, the demand for high-resolution and high-quality images such as HD (High Definition) images and UHD (Ultra High Definition) images has been increasing in various application fields, and accordingly, highly efficient image compression technologies are being discussed.

There are a variety of technologies such as inter-prediction technology that predicts a pixel value included in a current picture from a picture before or after a current picture with video compression technology, intra-prediction technology that predicts a pixel value included in a current picture by using pixel information in a current picture, entropy coding technology that allocates a short sign to a value with high appearance frequency and a long sign to a value with low appearance frequency, etc. and these image compression technologies may be used to effectively compress image data and transmit or store it.

SUMMARY

The present disclosure intends to provide a symmetric motion vector difference-based affine prediction method and device.

The present disclosure intends to provide a method and a device for supporting a variety of motion models based on a symmetric motion vector difference.

An image decoding method and device according to the present disclosure may acquire a first flag indicating whether a symmetric motion vector difference is used for a current block; acquire a control point vector difference of the current block on the basis of the first flag; derive a control point vector of the current block on the basis of the control point vector difference; derive a motion vector of the current block on the basis of the control point vector; and generate a prediction sample of the current block by using the motion vector.

In an image decoding method and device according to the present disclosure, the control point vector may include at least two of a first control point vector showing a motion vector of a first control point corresponding to a top-left corner position of the current block, a second control point vector showing a motion vector of a second control point corresponding to a top-right corner position of the current block, a third control point vector showing a motion vector of a third control point corresponding to a bottom-left corner position of the current block or a fourth control point vector showing a motion vector of a fourth control point corresponding to a bottom-right corner position of the current block.

In an image decoding method and device according to the present disclosure, when the first flag indicates that the symmetric motion vector difference is used, the control point vector difference may be acquired by deriving a control point vector difference in a first direction based on a control point vector difference in a second direction.

In an image decoding method and device according to the present disclosure, a control point vector difference in the first direction may be derived as a value whose magnitude is the same as and sign is opposite to a control point vector difference in the second direction.

An image decoding method and device according to the present disclosure may acquire an index indicating an affine parameter type used for the current block among a plurality of affine parameter types.

In an image decoding method and device according to the present disclosure, the plurality of affine parameter types may include at least one of a 4-parameter type, a 6-parameter type or a 8-parameter type.

In an image decoding method and device according to the present disclosure, the 8-parameter type may be indicated by the index only when the first flag indicates that the symmetric motion vector difference is used.

In an image decoding method and device according to the present disclosure, the fourth control point vector may be derived based on a control point vector difference of the first control point and a control point vector difference of the fourth control point.

In an image decoding method and device according to the present disclosure, the fourth control point vector may be derived based on a control point vector difference of the first control point, a control point vector difference of the second control point and a control point vector difference of the fourth control point.

In an image decoding method and device according to the present disclosure, the fourth control point vector may be derived based on a control point vector difference of the first control point, a control point vector difference of the third control point and a control point vector difference of the fourth control point.

In an image decoding method and device according to the present disclosure, the fourth control point vector may be derived by using any one of a control point vector difference of the first control point and a control point vector difference of the second control point.

An image decoding method and device according to the present disclosure may acquire a second flag indicating a control point set that the symmetric motion vector difference is used among a plurality of control point sets when the first flag indicates that the symmetric motion vector difference is used.

In an image decoding method and device according to the present disclosure, the plurality of control point sets may include a first control point set and a second control point set, and the first control point set may include a first control point corresponding to a top-left corner position of the current block and a second control point corresponding to a top-right corner position of the current block, and the second control point set may include the first control point and a third control point corresponding to a bottom-left corner position of the current block.

An image decoding method and device according to the present disclosure may acquire a third flag indicating whether a symmetric motion vector difference for affine prediction is activated.

In an image decoding method and device according to the present disclosure, the third flag may be signaled through at least one of a sequence parameter set (SPS), a picture parameter set (PPS), a picture header (PH) or a slice header (SH).

An image encoding method and device according to the present disclosure may determine whether a symmetric motion vector difference is used for a current block, determine a control point vector of the current block, determine a motion vector of the current block based on the control point vector and generate a prediction sample of the current block by using the motion vector.

In an image encoding method and device according to the present disclosure, a control point vector difference of the current block may be encoded based on whether the symmetric motion vector difference is used and the control point vector.

In an image encoding method and device according to the present disclosure, the control point vector may include at least two of a first control point vector showing a motion vector of a first control point corresponding to a top-left corner position of the current block, a second control point vector showing a motion vector of a second control point corresponding to a top-right corner position of the current block, a third control point vector showing a motion vector of a third control point corresponding to a bottom-left corner position of the current block or a fourth control point vector showing a motion vector of a fourth control point corresponding to a bottom-right corner position of the current block.

In an image encoding method and device according to the present disclosure, when the symmetric motion vector difference is used, the control point vector difference may be determined based on a control point vector difference in a first direction and a control point vector difference in a second direction.

In an image encoding method and device according to the present disclosure, a control point vector difference in the first direction may be determined as a value whose magnitude is the same as and sign is opposite to a control point vector difference in the second direction.

An image encoding method and device according to the present disclosure may encode an index indicating an affine parameter type used for the current block among a plurality of affine parameter types.

In an image encoding method and device according to the present disclosure, the plurality of affine parameter types may include at least one of a 4-parameter type, a 6-parameter type or a 8-parameter type.

In an image encoding method and device according to the present disclosure, the 8-parameter type may be indicated by the index only when the symmetric motion vector difference is used.

In an image encoding method and device according to the present disclosure, the fourth control point vector may be derived based on a control point vector difference of the first control point and a control point vector difference of the fourth control point.

In an image encoding method and device according to the present disclosure, the fourth control point vector may be derived based on a control point vector difference of the first control point, a control point vector difference of the second control point and a control point vector difference of the fourth control point.

In an image encoding method and device according to the present disclosure, the fourth control point vector may be derived based on a control point vector difference of the first control point, a control point vector difference of the third control point and a control point vector difference of the fourth control point.

In an image encoding method and device according to the present disclosure, the fourth control point vector may be derived by using any one of a control point vector difference of the first control point and a control point vector difference of the second control point.

An image encoding method and device according to the present disclosure may encode a second flag indicating a control point set that the symmetric motion vector difference is used among a plurality of control point sets when it is determined that the symmetric motion vector difference is used.

In an image encoding method and device according to the present disclosure, the plurality of control point sets may include a first control point set and a second control point set, and the first control point set may include a first control point corresponding to a top-left corner position of the current block and a second control point corresponding to a top-right corner position of the current block, and the second control point set may include the first control point and a third control point corresponding to a bottom-left corner position of the current block.

An image encoding method and device according to the present disclosure may encode a third flag indicating whether a symmetric motion vector difference for affine prediction is activated.

In an image encoding method and device according to the present disclosure, the third flag may be signaled through at least one of a sequence parameter set (SPS), a picture parameter set (PPS), a picture header (PH) or a slice header (SH).

A computer-readable digital storage medium storing encoded video/image information resulting in performing an image decoding method due to a decoding device according to the present disclosure is provided.

A computer-readable digital storage medium storing video/image information generated according to an image encoding method according to the present disclosure is provided.

According to the present disclosure, a symmetric motion vector difference may be used for affine prediction to reduce signaling overhead according to signaling a bidirectional motion vector difference for each control point and improve image compression performance.

According to the present disclosure, prediction performance may be improved by supporting various motion models by using a symmetric motion vector difference.

DETAILED DESCRIPTION

Figure 1:
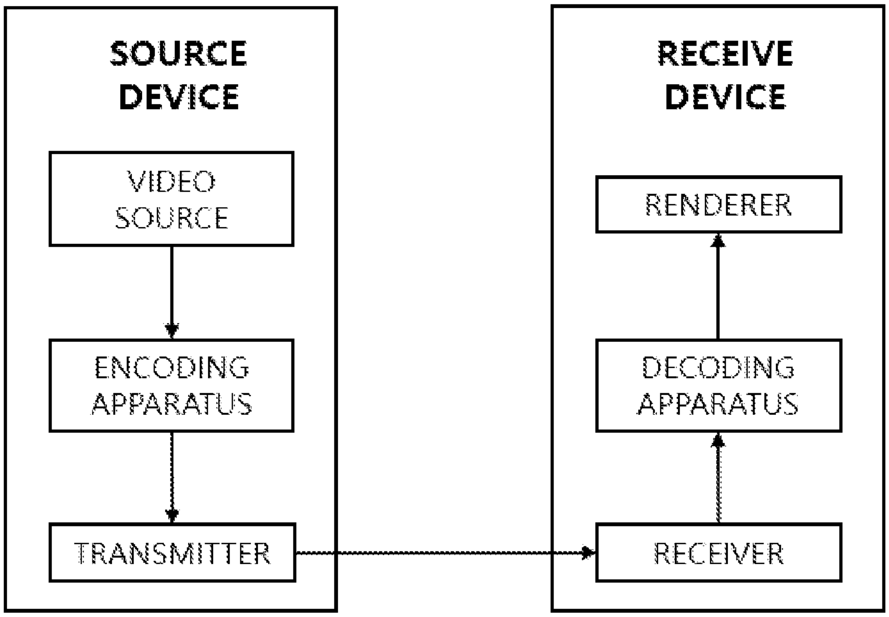
FIG. 1 shows a video/image coding system according to the present disclosure.

Since the present disclosure may make various changes and have several embodiments, specific embodiments will be illustrated in a drawing and described in detail in a detailed description. However, it is not intended to limit the present disclosure to a specific embodiment, and should be understood to include all changes, equivalents and substitutes included in the spirit and technical scope of the present disclosure. While describing each drawing, similar reference numerals are used for similar components.

A term such as first, second, etc. may be used to describe various components, but the components should not be limited by the terms. The terms are used only to distinguish one component from other components. For example, a first component may be referred to as a second component without departing from the scope of a right of the present disclosure, and similarly, a second component may also be referred to as a first component. A term of and/or includes any of a plurality of related stated items or a combination of a plurality of related stated items.

When a component is referred to as "being connected" or "being linked" to another component, it should be understood that it may be directly connected or linked to another component, but another component may exist in the middle. On the other hand, when a component is referred to as "being directly connected" or "being directly linked" to another component, it should be understood that there is no another component in the middle.

A term used in this application is just used to describe a specific embodiment, and is not intended to limit the present disclosure. Singular expressions include plural expressions unless the context clearly dictates otherwise. In this application, it should be understood that a term such as "include" or "have", etc. is intended to designate the presence of features, numbers, steps, operations, components, parts or combinations thereof described in the specification, but does not exclude in advance the possibility of presence or addition of one or more other features, numbers, steps, operations, components, parts or combinations thereof.

The present disclosure relates to video/image coding. For example, a method/an embodiment disclosed herein may be applied to a method disclosed in the versatile video coding (VVC) standard. In addition, a method/an embodiment disclosed herein may be applied to a method disclosed in the essential video coding (EVC) standard, the AOMedia Video 1 (AV1) standard, the 2nd generation of audio video coding standard (AVS2) or the next-generation video/image coding standard (ex. H.267 or H.268, etc.).

This specification proposes various embodiments of video/image coding, and unless otherwise specified, the embodiments may be performed in combination with each other.

Herein, a video may refer to a set of a series of images over time. A picture generally refers to a unit representing one image in a specific time period, and a slice/a tile is a unit that forms part of a picture in coding. A slice/a tile may include at least one coding tree unit (CTU). One picture may consist of at least one slice/tile. One tile is a rectangular area composed of a plurality of CTUs within a specific tile column and a specific tile row of one picture. A tile column is a rectangular area of CTUs having the same height as that of a picture and a width designated by a syntax requirement of a picture parameter set. A tile row is a rectangular area of CTUs having a height designated by a picture parameter set and the same width as that of a picture. CTUs within one tile may be arranged consecutively according to CTU raster scan, while tiles within one picture may be arranged consecutively according to raster scan of a tile. One slice may include an integer number of complete tiles or an integer number of consecutive complete CTU rows within a tile of a picture that may be included exclusively in a single NAL unit. Meanwhile, one picture may be divided into at least two sub-pictures. A sub-picture may be a rectangular area of at least one slice within a picture.

A pixel, a pixel or a pel may refer to the minimum unit that constitutes one picture (or image). In addition, 'sample' may be used as a term corresponding to a pixel. A sample may generally represent a pixel or a pixel value, and may represent only a pixel/a pixel value of a luma component, or only a pixel/a pixel value of a chroma component.

A unit may represent a basic unit of image processing. A unit may include at least one of a specific area of a picture and information related to a corresponding area. One unit may include one luma block and two chroma (ex. cb, cr) blocks. In some cases, a unit may be used interchangeably with a term such as a block or an area, etc. In a general case, a M×N block may include a set (or an array) of transform coefficients or samples (or sample arrays) consisting of M columns and N rows.

Herein, "A or B" may refer to "only A", "only B" or "both A and B." In other words, herein, "A or B" may be interpreted as "A and/or B." For example, herein, "A, B or C" may refer to "only A", "only B", "only C" or "any combination of A, B and C)".

A slash (/) or a comma used herein may refer to "and/or." For example, "A/B" may refer to "A and/or B." Accordingly, "A/B" may refer to "only A", "only B" or "both A and B." For example, "A, B, C" may refer to "A, B, or C".

Herein, "at least one of A and B" may refer to "only A", "only B" or "both A and B". In addition, herein, an expression such as "at least one of A or B" or "at least one of A and/or B" may be interpreted in the same way as "at least one of A and B".

In addition, herein, "at least one of A, B and C" may refer to "only A", "only B", "only C", or "any combination of A, B and C". In addition, "at least one of A, B or C" or "at least one of A, B and/or C" may refer to "at least one of A, B and C".

In addition, a parenthesis used herein may refer to "for example." Specifically, when indicated as "prediction (intra prediction)", "intra prediction" may be proposed as an example of "prediction". In other words, "prediction" herein is not limited to "intra prediction" and "intra prediction" may be proposed as an example of "prediction." In addition, even when indicated as "prediction (i.e., intra prediction)", "intra prediction" may be proposed as an example of "prediction."

Herein, a technical feature described individually in one drawing may be implemented individually or simultaneously.

FIG. 1 shows a video/image coding system according to the present disclosure.

Referring to FIG. 1, a video/image coding system may include a first device (a source device) and a second device (a receiving device).

A source device may transmit encoded video/image information or data in a form of a file or streaming to a receiving device through a digital storage medium or a network. The source device may include a video source, an encoding device and a transmission unit. The receiving device may include a reception unit, a decoding device and a renderer. The encoding device may be referred to as a video/image encoding device and the decoding device may be referred to as a video/image decoding device. A transmitter may be included in an encoding device. A receiver may be included in a decoding device. A renderer may include a display unit, and a display unit may be composed of a separate device or an external component.

A video source may acquire a video/an image through a process of capturing, synthesizing or generating a video/an image. A video source may include a device of capturing a video/an image and a device of generating a video/an image. A device of capturing a video/an image may include at least one camera, a video/image archive including previously captured videos/images, etc. A device of generating a video/an image may include a computer, a tablet, a smartphone, etc. and may (electronically) generate a video/an image. For example, a virtual video/image may be generated through a computer, etc., and in this case, a process of capturing a video/an image may be replaced by a process of generating related data.

An encoding device may encode an input video/image. An encoding device may perform a series of procedures such as prediction, transform, quantization, etc. for compression and coding efficiency. Encoded data (encoded video/image information) may be output in a form of a bitstream.

A transmission unit may transmit encoded video/image information or data output in a form of a bitstream to a reception unit of a receiving device through a digital storage medium or a network in a form of a file or streaming. A digital storage medium may include various storage media such as USB, SD, CD, DVD, Blu-ray, HDD, SSD, etc. A transmission unit may include an element for generating a media file through a predetermined file format and may include an element for transmission through a broadcasting/communication network. A reception unit may receive/extract the bitstream and transmit it to a decoding device.

A decoding device may decode a video/an image by performing a series of procedures such as dequantization, inverse transform, prediction, etc. corresponding to an operation of an encoding device.

A renderer may render a decoded video/image. A rendered video/image may be displayed through a display unit.

Figure 2:
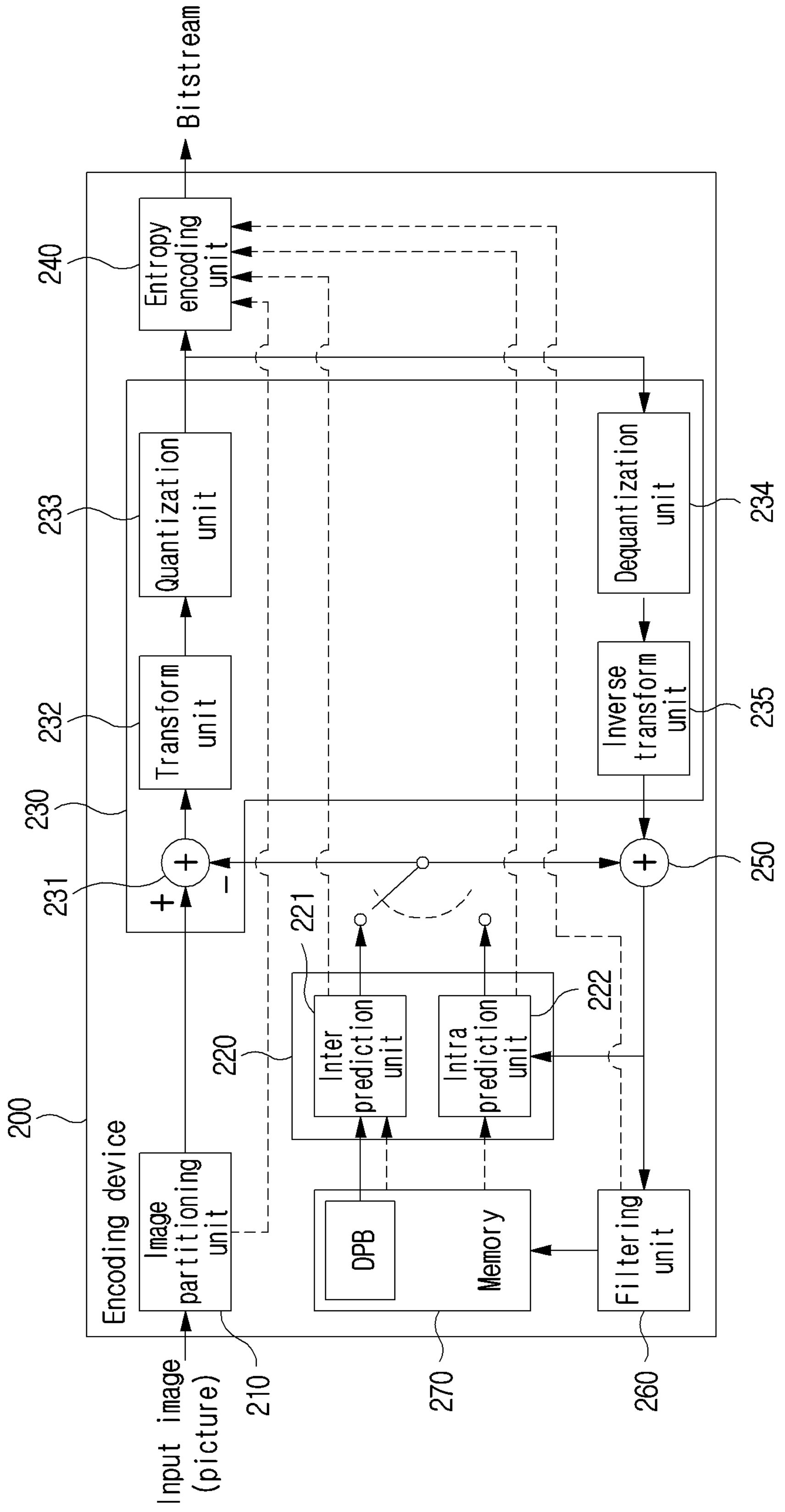
FIG. 2 shows a rough block diagram of an encoding device to which an embodiment of the present disclosure may be applied and encoding of a video/image signal is performed.

FIG. 2 shows a rough block diagram of an encoding device to which an embodiment of the present disclosure may be applied and encoding of a video/image signal is performed.

Referring to FIG. 2, an encoding device 200 may be composed of an image partitioner 210, a predictor 220, a residual processor 230, an entropy encoder 240, an adder 250, a filter 260 and a memory 270. A predictor 220 may include an inter predictor 221 and an intra predictor 222. A residual processor 230 may include a transformer 232, a quantizer 233, a dequantizer 234 and an inverse transformer 235. A residual processor 230 may further include a subtractor 231.

An adder 250 may be referred to as a reconstructor or a reconstructed block generator. The above-described image partitioner 210, predictor 220, residual processor 230, entropy encoder 240, adder 250 and filter 260 may be configured by at least one hardware component (e.g., an encoder chipset or a processor) according to an embodiment. In addition, a memory 270 may include a decoded picture buffer (DPB) and may be configured by a digital storage medium. The hardware component may further include a memory 270 as an internal/external component.

An image partitioner 210 may partition an input image (or picture, frame) input to an encoding device 200 into at least one processing unit. As an example, the processing unit may be referred to as a coding unit (CU). In this case, a coding unit may be partitioned recursively according to a quad-tree binary-tree ternary-tree (QTBTTT) structure from a coding tree unit (CTU) or the largest coding unit (LCU).

For example, one coding unit may be partitioned into a plurality of coding units with a deeper depth based on a quad tree structure, a binary tree structure and/or a ternary structure. In this case, for example, a quad tree structure may be applied first and a binary tree structure and/or a ternary structure may be applied later. Alternatively, a binary tree structure may be applied before a quad tree structure. A coding procedure according to this specification may be performed based on a final coding unit that is no longer partitioned. In this case, based on coding efficiency, etc. according to an image characteristic, the largest coding unit may be directly used as a final coding unit, or if necessary, a coding unit may be recursively partitioned into coding units of a deeper depth, and a coding unit with an optimal size may be used as a final coding unit. Here, a coding procedure may include a procedure such as prediction, transform, and reconstruction, etc. described later.

As another example, the processing unit may further include a prediction unit (PU) or a transform unit (TU). In this case, the prediction unit and the transform unit may be divided or partitioned from a final coding unit described above, respectively. The prediction unit may be a unit of sample prediction, and the transform unit may be a unit for deriving a transform coefficient and/or a unit for deriving a residual signal from a transform coefficient.

In some cases, a unit may be used interchangeably with a term such as a block or an area, etc. In a general case, a M×N block may represent a set of transform coefficients or samples consisting of M columns and N rows. A sample may generally represent a pixel or a pixel value, and may represent only a pixel/a pixel value of a luma component, or only a pixel/a pixel value of a chroma component. A sample may be used as a term that makes one picture (or image) correspond to a pixel or a pel.

An encoding device 200 may subtract a prediction signal (a prediction block, a prediction sample array) output from an inter predictor 221 or an intra predictor 222 from an input image signal (an original block, an original sample array) to generate a residual signal (a residual signal, a residual sample array), and a generated residual signal is transmitted to a transformer 232. In this case, a unit that subtracts a prediction signal (a prediction block, a prediction sample array) from an input image signal (an original block, an original sample array) within an encoding device 200 may be referred to as a subtractor 231.

A predictor 220 may perform prediction on a block to be processed (hereinafter, referred to as a current block) and generate a predicted block including prediction samples for the current block. A predictor 220 may determine whether intra prediction or inter prediction is applied in a unit of a current block or a CU. A predictor 220 may generate various information on prediction such as prediction mode information, etc. and transmit it to an entropy encoder 240 as described later in a description of each prediction mode. Information on prediction may be encoded in an entropy encoder 240 and output in a form of a bitstream.

An intra predictor 222 may predict a current block by referring to samples within a current picture. The samples referred to may be positioned in the neighborhood of the current block or may be positioned a certain distance away from the current block according to a mode and a plurality of directional modes. A nondirectional mode may include at least one of a DC mode or a planar mode. A directional mode may include 33 directional modes or 65 directional modes according to a detail level of a prediction direction. However, it is an example, and more or less directional modes may be used according to a configuration. An intra predictor 222 may determine a prediction mode applied to a current block by using a prediction mode applied to a neighboring block.

An inter predictor 221 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. A reference picture including the reference block and a reference picture including the temporal neighboring block may be the same or different. The temporal neighboring block may be referred to as a collocated reference block, a collocated CU (colCU), etc., and a reference picture including the temporal neighboring block may be referred to as a collocated picture (colPic). For example, an inter predictor 221 may configure a motion information candidate list based on neighboring blocks and generate information indicating which candidate is used to derive a motion vector and/or a reference picture index of the current block. Inter prediction may be performed based on various prediction modes, and for example, for a skip mode and a merge mode, an inter predictor 221 may use motion information of a neighboring block as motion information of a current block. For a skip mode, unlike a merge mode, a residual signal may not be transmitted. For a motion vector prediction (MVP) mode, a motion vector of a surrounding block is used as a motion vector predictor and a motion vector difference is signaled to indicate a motion vector of a current block.

A predictor 220 may generate a prediction signal based on various prediction methods described later. For example, a predictor may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, a sample value within a picture may be signaled based on information on a palette table and a palette index. A prediction signal generated through the predictor 220 may be used to generate a reconstructed signal or a residual signal.

A transformer 232 may generate transform coefficients by applying a transform technique to a residual signal. For example, a transform technique may include at least one of Discrete Cosine Transform (DCT), Discrete Sine Transform (DST), Karhunen-Loève Transform (KLT), Graph-Based Transform (GBT) or Conditionally Non-linear Transform (CNT). Here, GBT refers to transform obtained from this graph when relationship information between pixels is expressed as a graph. CNT refers to transform obtained based on generating a prediction signal by using all previously reconstructed pixels. In addition, a transform process may be applied to a square pixel block in the same size or may be applied to a non-square block in a variable size.

A quantizer 233 may quantize transform coefficients and transmit them to an entropy encoder 240 and an entropy encoder 240 may encode a quantized signal (information on quantized transform coefficients) and output it as a bitstream. Information on the quantized transform coefficients may be referred to as residual information. A quantizer 233 may rearrange quantized transform coefficients in a block form into an one-dimensional vector form based on coefficient scan order, and may generate information on the quantized transform coefficients based on the quantized transform coefficients in the one-dimensional vector form.

An entropy encoder 240 may perform various encoding methods such as exponential Golomb, context-adaptive variable length coding (CAVLC), context-adaptive binary arithmetic coding (CABAC), etc. An entropy encoder 240 may encode information necessary for video/image reconstruction (e.g., a value of syntax elements, etc.) other than quantized transform coefficients together or separately.

Encoded information (ex. encoded video/image information) may be transmitted or stored in a unit of a network abstraction layer (NAL) unit in a bitstream form. The video/image information may further include information on various parameter sets such as an adaptation parameter set (APS), a picture parameter set (PPS), a sequence parameter set (SPS) or a video parameter set (VPS), etc. In addition, the video/image information may further include general constraint information. Herein, information and/or syntax elements transmitted/signaled from an encoding device to a decoding device may be included in video/image information. The video/image information may be encoded through the above-described encoding procedure and included in the bitstream. The bitstream may be transmitted through a network or may be stored in a digital storage medium. Here, a network may include a broadcasting network and/or a communication network, etc. and a digital storage medium may include various storage media such as USB, SD, CD, DVD, Blu-ray, HDD, SSD, etc. A transmission unit (not shown) for transmitting and/or a storage unit (not shown) for storing a signal output from an entropy encoder 240 may be configured as an internal/external element of an encoding device 200, or a transmission unit may be also included in an entropy encoder 240.

Quantized transform coefficients output from a quantizer 233 may be used to generate a prediction signal. For example, a residual signal (a residual block or residual samples) may be reconstructed by applying dequantization and inverse transform to quantized transform coefficients through a dequantizer 234 and an inverse transformer 235. An adder 250 may add a reconstructed residual signal to a prediction signal output from an inter predictor 221 or an intra predictor 222 to generate a reconstructed signal (a reconstructed picture, a reconstructed block, a reconstructed sample array). When there is no residual for a block to be processed like when a skip mode is applied, a predicted block may be used as a reconstructed block. An adder 250 may be referred to as a reconstructor or a reconstructed block generator. A generated reconstructed signal may be used for intra prediction of a next block to be processed within a current picture, and may be also used for inter prediction of a next picture through filtering as described later. Meanwhile, luma mapping with chroma scaling (LMCS) may be applied in a picture encoding and/or reconstruction process.

A filter 260 may improve subjective/objective image quality by applying filtering to a reconstructed signal. For example, a filter 260 may generate a modified reconstructed picture by applying various filtering methods to a reconstructed picture, and may store the modified reconstructed picture in a memory 270, specifically in a DPB of a memory 270. The various filtering methods may include deblocking filtering, sample adaptive offset, adaptive loop filter, bilateral filter, etc. A filter 260 may generate various information on filtering and transmit it to an entropy encoder 240. Information on filtering may be encoded in an entropy encoder 240 and output in a form of a bitstream.

A modified reconstructed picture transmitted to a memory 270 may be used as a reference picture in an inter predictor 221. When inter prediction is applied through it, an encoding device may avoid prediction mismatch in an encoding device 200 and a decoding device, and may also improve encoding efficiency.

A DPB of a memory 270 may store a modified reconstructed picture to use it as a reference picture in an inter predictor 221. A memory 270 may store motion information of a block from which motion information in a current picture is derived (or encoded) and/or motion information of blocks in a pre-reconstructed picture. The stored motion information may be transmitted to an inter predictor 221 to be used as motion information of a spatial neighboring block or motion information of a temporal neighboring block. A memory 270 may store reconstructed samples of reconstructed blocks in a current picture and transmit them to an intra predictor 222.

Figure 3:
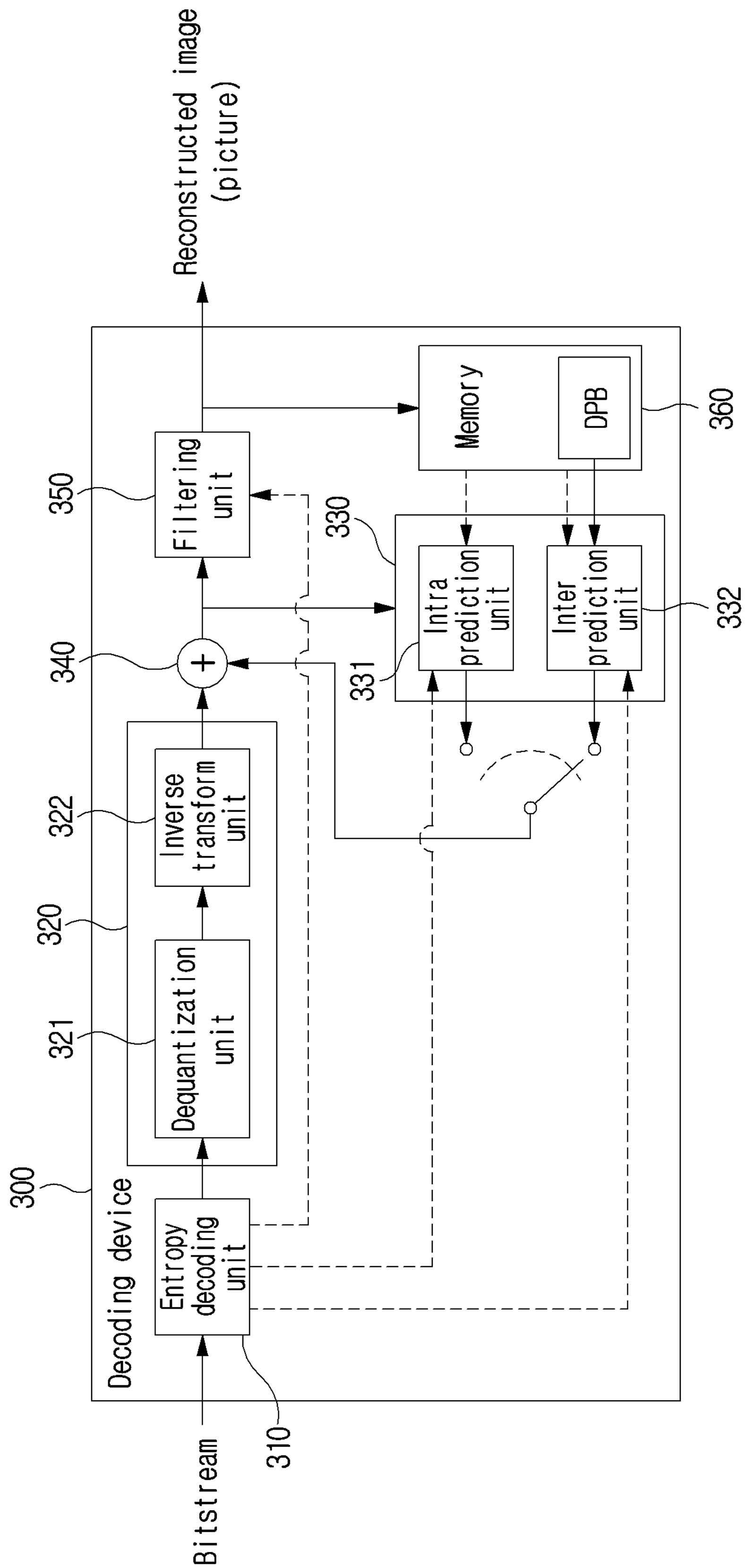
FIG. 3 shows a rough block diagram of a decoding device to which an embodiment of the present disclosure may be applied and decoding of a video/image signal is performed.

FIG. 3 shows a rough block diagram of a decoding device to which an embodiment of the present disclosure may be applied and decoding of a video/image signal is performed.

Referring to FIG. 3, a decoding device 300 may be configured by including an entropy decoder 310, a residual processor 320, a predictor 330, an adder 340, a filter 350 and a memory 360. A predictor 330 may include an inter predictor 331 and an intra predictor 332. A residual processor 320 may include a dequantizer 321 and an inverse transformer 321.

According to an embodiment, the above-described entropy decoder 310, residual processor 320, predictor 330, adder 340 and filter 350 may be configured by one hardware component (e.g., a decoder chipset or a processor). In addition, a memory 360 may include a decoded picture buffer (DPB) and may be configured by a digital storage medium. The hardware component may further include a memory 360 as an internal/external component.

When a bitstream including video/image information is input, a decoding device 300 may reconstruct an image in response to a process in which video/image information is processed in an encoding device of FIG. 2. For example, a decoding device 300 may derive units/blocks based on block partition-related information obtained from the bitstream. A decoding device 300 may perform decoding by using a processing unit applied in an encoding device. Accordingly, a processing unit of decoding may be a coding unit, and a coding unit may be partitioned from a coding tree unit or the largest coding unit according to a quad tree structure, a binary tree structure and/or a ternary tree structure. At least one transform unit may be derived from a coding unit. And, a reconstructed image signal decoded and output through a decoding device 300 may be played through a playback device.

A decoding device 300 may receive a signal output from an encoding device of FIG. 2 in a form of a bitstream, and a received signal may be decoded through an entropy decoder 310. For example, an entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS) or a video parameter set (VPS), etc. In addition, the video/image information may further include general constraint information. A decoding device may decode a picture further based on information on the parameter set and/or the general constraint information. Signaled/received information and/or syntax elements described later herein may be decoded through the decoding procedure and obtained from the bitstream. For example, an entropy decoder 310 may decode information in a bitstream based on a coding method such as exponential Golomb encoding, CAVLC, CABAC, etc. and output a value of a syntax element necessary for image reconstruction and quantized values of a transform coefficient regarding a residual. In more detail, a CABAC entropy decoding method may receive a bin corresponding to each syntax element from a bitstream, determine a context model by using syntax element information to be decoded, decoding information of a surrounding block and a block to be decoded or information of a symbol/a bin decoded in a previous step, perform arithmetic decoding of a bin by predicting a probability of occurrence of a bin according to a determined context model and generate a symbol corresponding to a value of each syntax element. In this case, a CABAC entropy decoding method may update a context model by using information on a decoded symbol/bin for a context model of a next symbol/bin after determining a context model. Among information decoded in an entropy decoder 310, information on prediction is provided to a predictor (an inter predictor 332 and an intra predictor 331), and a residual value on which entropy decoding was performed in an entropy decoder 310, i.e., quantized transform coefficients and related parameter information may be input to a residual processor 320. A residual processor 320 may derive a residual signal (a residual block, residual samples, a residual sample array). In addition, information on filtering among information decoded in an entropy decoder 310 may be provided to a filter 350. Meanwhile, a reception unit (not shown) that receives a signal output from an encoding device may be further configured as an internal/external element of a decoding device 300 or a reception unit may be a component of an entropy decoder 310.

Meanwhile, a decoding device according to this specification may be referred to as a video/image/picture decoding device, and the decoding device may be divided into an information decoder (a video/image/picture information decoder) and a sample decoder (a video/image/picture sample decoder). The information decoder may include the entropy decoder 310 and the sample decoder may include at least one of dequantizer 321, the inverse transformer 322, the adder 340, the filter 350, the memory 360, the inter predictor 332 and the intra predictor 331.

A dequantizer 321 may dequantize quantized transform coefficients and output transform coefficients. A dequantizer 321 may rearrange quantized transform coefficients into a two-dimensional block form. In this case, the rearrangement may be performed based on coefficient scan order performed in an encoding device. A dequantizer 321 may perform dequantization on quantized transform coefficients by using a quantization parameter (e.g., quantization step size information) and obtain transform coefficients.

An inverse transformer 322 inversely transforms transform coefficients to obtain a residual signal (a residual block, a residual sample array).

A predictor 320 may perform prediction on a current block and generate a predicted block including prediction samples for the current block. A predictor 320 may determine whether intra prediction or inter prediction is applied to the current block based on the information on prediction output from an entropy decoder 310 and determine a specific intra/inter prediction mode.

A predictor 320 may generate a prediction signal based on various prediction methods described later. For example, a predictor 320 may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, information on a palette table and a palette index may be included in the video/image information and signaled.

An intra predictor 331 may predict a current block by referring to samples within a current picture. The samples referred to may be positioned in the neighborhood of the current block or may be positioned a certain distance away from the current block according to a mode and a plurality of directional modes. An intra predictor 331 may determine a prediction mode applied to a current block by using a prediction mode applied to a neighboring block.

An inter predictor 332 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. For example, an inter predictor 332 may configure a motion information candidate list based on neighboring blocks and derive a motion vector and/or a reference picture index of the current block based on received candidate selection information. Inter prediction may be performed based on various prediction modes, and the information on prediction may include information indicating an inter prediction mode for the current block.

An adder 340 may add an obtained residual signal to a prediction signal (a prediction block, a prediction sample array) output from a predictor (including an inter predictor 332 and/or an intra predictor 331) to generate a reconstructed signal (a reconstructed picture, a reconstructed block, a reconstructed sample array). When there is no residual for a block to be processed like when a skip mode is applied, a prediction block may be used as a reconstructed block.

An adder 340 may be referred to as a reconstructor or a reconstructed block generator. A generated reconstructed signal may be used for intra prediction of a next block to be processed in a current picture, may be output through filtering as described later or may be used for inter prediction of a next picture. Meanwhile, luma mapping with chroma scaling (LMCS) may be applied in a picture decoding process.

A filter 350 may improve subjective/objective image quality by applying filtering to a reconstructed signal. For example, a filter 350 may generate a modified reconstructed picture by applying various filtering methods to a reconstructed picture and transmit the modified reconstructed picture to a memory 360, specifically a DPB of a memory 360. The various filtering methods may include deblocking filtering, sample adaptive offset, adaptive loop filter, bilateral filter, etc.

The (modified) reconstructed picture stored in the DPB of the memory 360 can be used as a reference picture in the inter prediction unit 332. A memory 360 may store motion information of a block from which motion information in a current picture is derived (or decoded) and/or motion information of blocks in a pre-reconstructed picture. The stored motion information may be transmitted to an inter predictor 260 to be used as motion information of a spatial neighboring block or motion information of a temporal neighboring block. A memory 360 may store reconstructed samples of reconstructed blocks in a current picture and transmit them to an intra predictor 331.

Herein, embodiments described in a filter 260, an inter predictor 221 and an intra predictor 222 of an encoding device 200 may be also applied equally or correspondingly to a filter 350, an inter predictor 332 and an intra predictor 331 of a decoding device 300, respectively.

Figure 4:
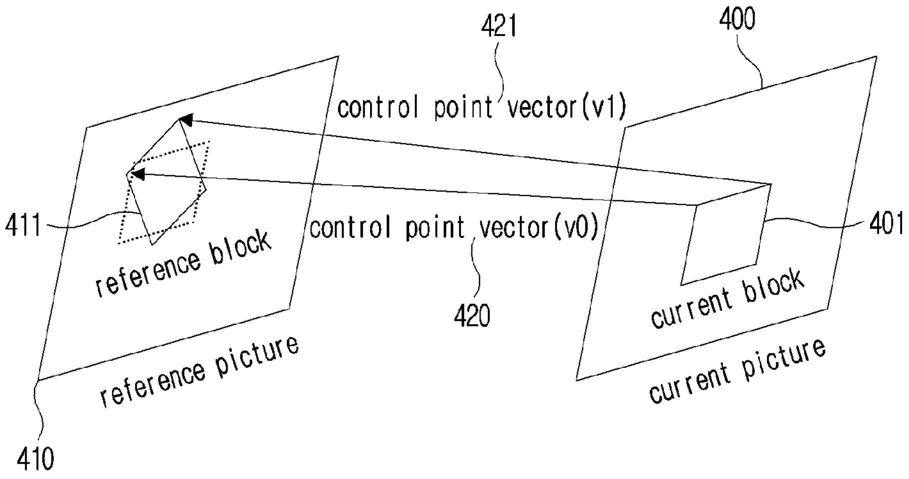
FIG. 4 shows the concept of performing inter-prediction based on an affine model according to an embodiment of the present disclosure.

FIG. 4 shows the concept of performing inter-prediction based on an affine model according to an embodiment of the present disclosure.

A general block-based prediction method supports translational motion-based motion prediction using a representative motion vector in a unit of a block. In the present disclosure, a prediction method using an affine model is used to process various and complex motion models such as rotation, zooming, etc. that are difficult to process with a general block-based prediction method.

The affine model-based prediction is a method of performing prediction in an arbitrary shape by generating a motion vector corresponding to a point between a pixel in a current block and a pixel of a reference picture. However, the affine model-based prediction is not limited to prediction in a unit of a pixel, and it may be performed in a unit of a sub-block by partitioning a current block into multiple sub-blocks.

For the above-described general block-based prediction method, a current block may perform motion prediction in a unit of a block by using one motion vector. In this case, the one motion vector may exist per prediction direction, and the current block may refer to not only one coding unit (CU), but also a sub-block generated by partitioning one coding unit into multiple parts.

In performing prediction by using a reference block 411 within a reference picture 410 for a current block 401 within a current picture 400, affine model-based prediction may select multiple control points representing a current block and use a control point vector 420 and 421 corresponding to each control point to perform motion prediction in an arbitrary form. Affine model-based prediction may calculate a motion vector in a unit of a pixel of a current block 401 by using multiple control point vectors or may calculate a motion vector in a unit of a sub-block constituting a current block. Hereinafter, an affine model-based inter prediction method is described in detail.

Figure 5:
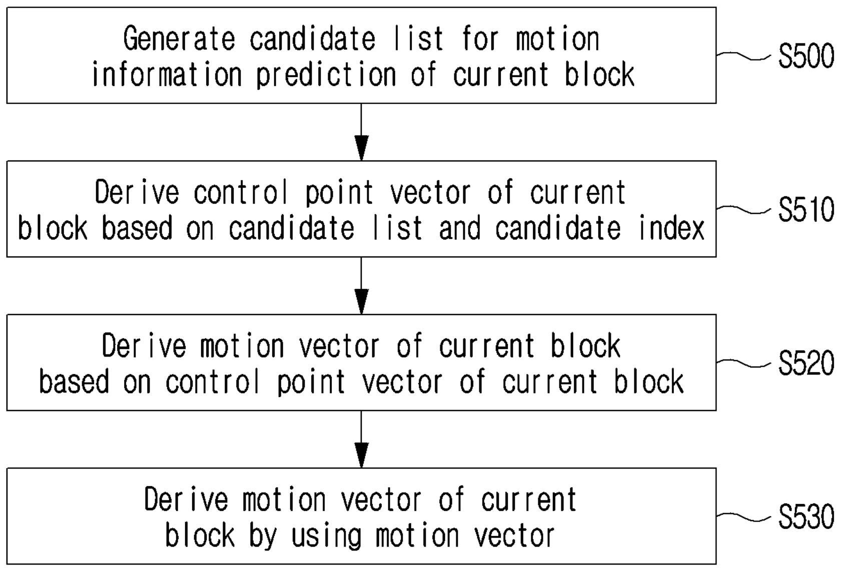
FIG. 5 shows an affine model-based inter prediction method according to an embodiment of the present disclosure.

FIG. 5 shows an affine model-based inter prediction method according to an embodiment of the present disclosure.

Referring to FIG. 5, a candidate list for motion information prediction of a current block may be generated S500.

The candidate list may include at least one affine model-based candidate (hereinafter referred to as an affine candidate). An affine candidate may refer to a candidate with a control point vector. A control point vector refers to a motion vector of a control point for an affine model, and may be defined for a corner position of a block (e.g., a position of at least one of a top-left, top-right, bottom-left or bottom-right corner).

An affine candidates may include at least one of a spatial candidate, a temporal candidate or a constructed candidate. Here, a spatial candidate may be derived from a vector of a neighboring block spatially adjacent to a current block, and a temporal candidate may be derived from a vector of a neighboring block temporally adjacent to a current block. Here, the neighboring block may refer to a block encoded by an affine model. The vector may refer to a motion vector or a control point vector.

Figure 6:
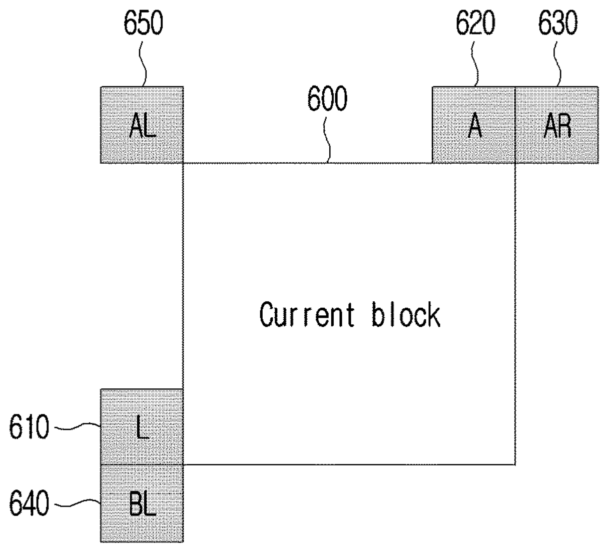
FIG. 6 relates to a method of deriving an affine candidate from a control point vector of a spatial/temporal neighboring block according to an embodiment of the present disclosure.

A method of deriving a spatial/temporal candidate based on a vector of a spatial/temporal neighboring block is described in detail by referring to FIG. 6.

Figure 7:
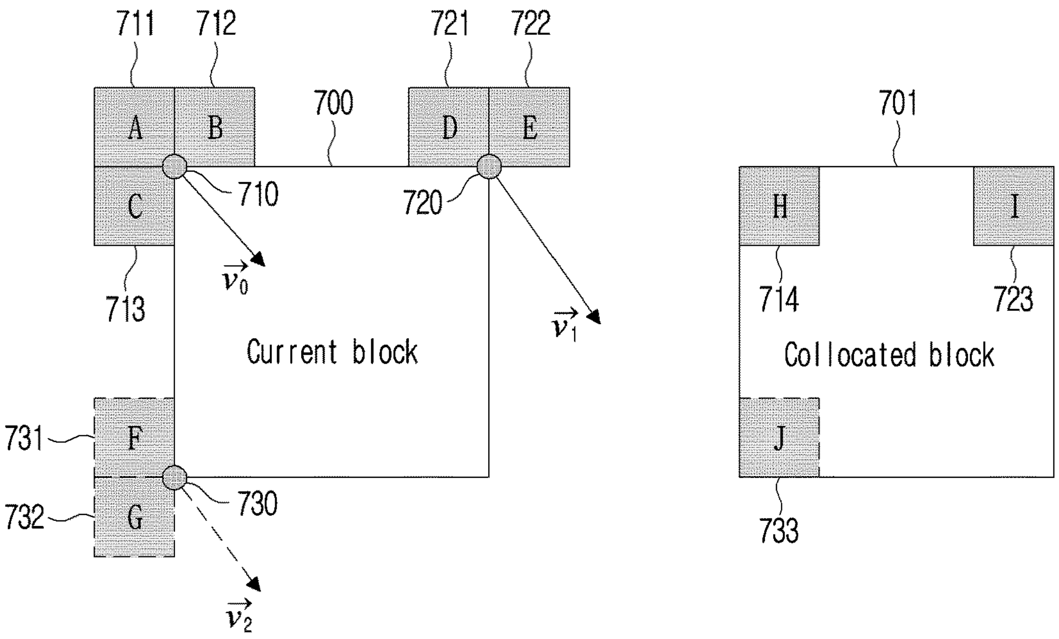
FIG. 7 shows a method of deriving a constructed candidate based on a combination of motion vectors of a spatial/temporal neighboring block according to an embodiment of the present disclosure.

Meanwhile, the constructed candidate may be derived based on a combination of motion vectors of a spatial/temporal neighboring block of a current block, which is described in detail by referring to FIG. 7.

A plurality of affine candidates described above may be arranged in a candidate list based on a predetermined priority. For example, a plurality of affine candidates may be arranged in a candidate list in order of a spatial candidate, a temporal candidate and a constructed candidate. Alternatively, a plurality of affine candidates may be arranged in a candidate list in order of a temporal candidate, a spatial candidate and a constructed candidate. However, it is not limited thereto, and a temporal candidate may be arranged after a constructed candidate. Alternatively, some of constructed candidates may be arranged before a spatial candidate and others may be arranged after a spatial candidate.

The candidate list may further include a sub-block-based temporal candidate. Motion information of the temporal candidate may be derived from a collocated block corresponding to a current block, which is described in detail by referring to FIG. 8.

Based on the candidate list and a candidate index, a control point vector of a current block may be derived S510.

A candidate index may refer to an index encoded to derive a control point vector of a current block. The candidate index may specify any one of a plurality of affine candidates included in a candidate list. A control point vector of a current block may be derived by using a control point vector of an affine candidate specified by the candidate index.

For example, it is assumed that a type of an affine model of a current block is a 4-parameter (i.e., a current block is determined to use two control point vectors). In this case, when an affine candidate specified by the candidate index has three control point vectors, only two control point vectors of the three control point vectors (e.g., a control point vectors with Idx=0, 1) may be selected, which may be configured as a control point vector of a current block. Alternatively, three control point vectors of the specified affine candidates may be configured as a control point vector of a current block In this case, a type of an affine model of a current block may be updated to a 6-parameter.

Conversely, it is assumed that a type of an affine model of a current block is a 6-parameter (i.e., a current block is determined to use three control point vectors). In this case, when an affine candidate specified by the candidate index has two control point vectors, one additional control point vector may be generated and two control point vectors and an additional control point vector of the affine candidate may be configured as a control point vector of a current block. The additional control point vector may be derived based on at least one of two control point vectors of an affine candidate, a size of a current/neighboring block or position information.

Alternatively, two control point vectors of the specified affine candidate may be configured as a control point vector of a current block. In this case, a type of an affine model of a current block may be updated to a 4-parameter.

Based on a control point vector of a current block, a motion vector of a current block may be derived S520.

The motion vector may be derived in a unit of a sub-block of a current block. For this purpose, a current block may be partitioned into a plurality of N×M sub-blocks. Here, a N×M sub-block may be in a shape of a rectangle (N>M or N<M) or a square (N=M). The N and M value may be 4, 8, 16, 32 or more. A method of deriving a motion vector in a unit of a sub-block is described in detail by referring to FIG. 9.

A process of deriving the motion vector may further include applying a predetermined offset to a motion vector derived based on a control point vector. An offset may refer to a vector for improving a pre-derived motion vector. An offset may be determined based on information on at least one of a size or a direction of an offset. The size (Absolute) may be an integer of 1, 2, 3, or more. The direction may include at least one direction of the left, right, top or bottom. Information on a size and/or a direction of the offset may be encoded and signaled in an encoding device. Alternatively, a size of an offset may be a fixed value pre-configured in a decoding device.

Inter prediction may be performed on a current block by using the derived motion vector S530.

Specifically, a reference block may be specified by using a motion vector of a current block. The reference block may be individually specified per sub-block of a current block. A reference block of each sub-block may belong to one reference picture. In other words, a sub-block belonging to a current block may share one reference picture. Alternatively, a reference picture index may be independently configured per sub-block of a current block.

The reference block may be specified by applying a predetermined interpolation filter to a reference picture. An encoding/decoding device may define n interpolation filters. Here, n may be an integer of 1, 2, 3 or more. At least one of n interpolation filters may have a different filter attribute from the other one. The filter attribute may include at least one of the number of filter taps (tap size) or a filter coefficient.

For example, the number of taps of a first interpolation filter may be p and the number of taps of a second interpolation filter may be q. Here, p may be a natural number smaller than q. p may be a natural number smaller than 7 (e.g., 6, 5, 4) and q may be a natural number greater than 7 (e.g., 8, 9, 10).

Table 1 below is an example of a filter coefficient of a 6-tap interpolation filter with p=6.

TABLE 1

| MV | Tap filter | | | | | |
|---|---|---|---|---|---|---|
| 0 | 0 | 0 | 64 | 0 | 0 | 0 |
| 1/16 | 1 | −3 | 63 | 4 | −2 | 1 |
| 1/8 | 1 | −5 | 62 | 8 | −3 | 1 |
| 3/16 | 2 | −8 | 60 | 13 | −4 | 1 |
| 1/4 | 3 | −10 | 58 | 17 | −5 | 1 |
| 5/16 | 3 | −11 | 52 | 26 | −8 | 2 |
| 3/8 | 2 | −9 | 47 | 31 | −10 | 3 |
| 7/16 | 3 | −11 | 45 | 34 | −10 | 3 |
| 1/2 | 3 | −11 | 40 | 40 | −11 | 3 |
| 9/16 | 3 | −10 | 34 | 45 | −11 | 3 |
| 5/8 | 3 | −10 | 31 | 47 | −9 | 2 |
| 11/16 | 2 | −8 | 26 | 52 | −11 | 3 |

TABLE 1-continued

| MV | Tap filter | | | | | |
|---|---|---|---|---|---|---|
| 6/8 | 1 | −5 | 17 | 58 | −10 | 3 |
| 13/16 | 1 | −4 | 13 | 60 | −8 | 2 |
| 7/8 | 1 | −3 | 8 | 62 | −5 | 1 |
| 15/16 | 1 | −2 | 4 | 63 | −3 | 1 |

Considering at least one of a size or a prediction mode of a block, any one of a plurality of interpolation filters described above may be selectively used. Here, a block may refer to a current block or a sub-block of a current block. The prediction mode may refer to a skip mode, a merge mode, an AMVP mode, an affine model-based prediction mode, a current picture reference mode, etc. A current picture reference mode may refer to a mode in which a current block is predicted by referring to a pre-reconstructed area within a current picture to which a current block belongs.

For example, when a size of a current block (or a sub-block of a current block) is less than or equal to a predetermined threshold size, a first interpolation filter may be used and otherwise, a second interpolation filter may be used. The threshold size may be defined as a block size in which at least one of a width and a height is 4, 8, or 16.

Alternatively, when a current block is encoded in a first prediction mode, a first interpolation filter may be applied and otherwise, a second interpolation filter may be applied. Here, a first prediction mode may refer to any one of the above-described prediction modes. For example, a first prediction mode may refer to an affine model-based prediction mode or a current picture reference mode.

Meanwhile, the derived motion vector may include at least one of a L0 motion vector or a L1 motion vector. When the motion vector includes a L0 and L1 motion vector, a decoding device may perform unidirectional prediction by configuring any one of the L0 and L1 motion vector as 0.

The configuration may be selectively performed by considering at least one of a size or a prediction mode of a block. Here, a block may refer to a current block or a sub-block of a current block. The prediction mode may refer to a skip mode, a merge mode, an AMVP mode, an affine model-based prediction mode, a current picture reference mode, etc.

For example, when a size of a current block (or a sub-block of a current block) is less than or equal to a predetermined threshold size, unidirectional prediction may be performed by configuring a L1 motion vector as 0 and otherwise, a L0 and L1 motion vector may be used to perform bidirectional prediction. Here, a threshold size may be defined as a block size where at least one of a width and a height is 4, 8, or 16.

Alternatively, when a current block is encoded in a first prediction mode, unidirectional prediction may be performed by configuring a L1 motion vector as 0, and otherwise, bidirectional prediction may be performed by using a L0 and L1 motion vector.

The specified reference block may be configured as a prediction block of a current block. A current block may be reconstructed by adding a residual block to the prediction block. An in-loop filter may be applied to a reconstructed current block, which is described by referring to FIG. 8.

The above-described embodiment may be applied equally/similarly not only to a merge mode, but also other inter modes (e.g., an AMVP mode, etc.). However, even when a current block is encoded in a merge mode or any other inter mode, affine model-based prediction may be selectively performed.

FIG. 6 relates to a method of deriving an affine candidate from a control point vector of a spatial/temporal neighboring block according to an embodiment of the present disclosure.

A width and a height of a current block 600 are chW and cbH, respectively, and a position of a current block is (xCb, yCb). A width and a height of a spatial neighboring block 610-650 are nbW and nbH, respectively, and a position of a spatial neighboring block is (xNb, yNb). A spatial neighboring block may include at least one of a left block 610, a bottom-left block 640, a top-right block 630, a top block 620 or a top-left block 650 of a current block. Alternatively, the spatial neighboring block may further include at least one of a block adjacent to the right or a block adjacent to the bottom of the top-left block 650.

A spatial candidate may have n control point vectors (cpMV). Here, a value of n may be an integer of 1, 2, 3, or more. A value of n may be determined based on at least one of information on whether decoding is performed in a unit of a sub-block, information on whether it is a block encoded with an affine model or information on a type of an affine model (a 4-parameter or a 6-parameter).

For example, according to the information, when a corresponding block is decoded in a unit of a sub-block or is a block encoded with an affine model, a corresponding block may have two control point vectors. On the other hand, otherwise, a corresponding block may not perform affine model-based prediction.

Alternatively, according to the information, when a corresponding block is a block encoded with an affine model and a type of an affine model is a 6-parameter, a corresponding block may have three control point vectors. On the other hand, otherwise, a corresponding block may not perform affine model-based prediction.

The above-described information may be encoded and signaled in an encoding device. Alternatively, all or part of the information may be derived from a decoding device based on an attribute of a block. Here, a block may refer to a current block or may refer to a spatial/temporal neighboring block of a current block. The attribute may refer to a size, a shape, a position, a partition type, an inter mode, a parameter on a residual coefficient, etc. As the inter mode is a pre-defined mode in a decoding device, it may refer to a merge mode, a skip mode, an AMVP mode, an affine model, an intra/inter combination mode, a current picture reference mode, etc. Alternatively, a value of n may be derived from a decoding device based on an attribute of a block described above.

In this embodiment, n control point vectors may be expressed as a first control point vector (cpMV[0]), a second control point vector (cpMV[1]), a third control point vector (cpMV[2]), . . . a n-th control point vector (cpMV[n−1]).

As an example, a first control point vector (cpMV[0]), a second control point vector (cpMV[1]), a third control point vector (cpMV[2]) and a fourth control point vector (cpMV [3]) may be a vector corresponding to a position of a top-left sample, a top-right sample, a bottom-left sample and a bottom-right sample of a block, respectively. Here, it is assumed that a spatial candidate has three control point vectors, and three control point vectors may be an arbitrary control point vector selected from a first to n-th control point vector. However, it is not limited thereto, and a spatial candidate may have two control point vectors, and two control point vectors may be an arbitrary control point vector selected from a first to n-th control point vector.

Hereinafter, a method of deriving a control point vector of a spatial candidate is described.

1. When a Boundary of a Current Block does not Border a CTU Boundary'

The first control point vector may be derived based on at least one of a first control point vector of a spatial neighboring block, a predetermined difference value, position information of a current block (xCb, yCb) or position information of a spatial neighboring block (xNb, yNb).

The number of difference values may be 1, 2, 3 or more. The number of difference values may be variably determined by considering an attribute of a block described above, or may be a fixed value which is pre-promised to a decoding device. The difference value may be defined as a difference value between any one and another one of a plurality of control point vectors. For example, the difference value may include at least one of a first difference value between a second control point vector and a first control point vector, a second difference value between a third control point vector and a first control point vector, a third difference value between a fourth control point vector and a third control point vector or a fourth difference value between a fourth control point vector and a second control point vector.

For example, a first control point vector may be derived as in Equation 1 below.

$$cpMvLX[0][0] = (mvScaleHor + dHorX*(xCb - xNb) + dHorY*(yCb - yNb))$$
$$cpMvLX[0][1] = (mvScaleVer + dVerX*(xCb - xNb) + dVerY*(yCb - yNb)) \quad \text{[Equation 1]}$$

In Equation 1, variable mvScaleHor and mvScaleVer may refer to a first control point vector of a spatial neighboring block, or may refer to a value derived by applying a shift operation by k to a first control point vector. Here, k may be an integer of 1, 2, 3, 4, 5, 6, 7, 8, 9 or more. Variable dHorX and dVerX correspond to a x component and a y component of a first difference value between a second control point vector and a first control point vector, respectively. Variable dHorY and dVerY correspond to a x component and a y component of a second difference value between a third control point vector and a first control point vector, respectively. The above-described variable may be derived as in Equation 2 below.

$$mvScaleHor = CpMvLX[xNb][yNb][0][0] << 7 \quad \text{[Equation 2]}$$
$$mvScaleVer = CpMvLX[xNb][yNb][0][1] << 7$$
$$dHorX = (CpMvLX[xNb + nNbW - 1][yNb][1][0] - CpMvLX[xNb][yNb][0][0]) << (7 - \log 2NbW)$$
$$dVerX = (CpMvLX[xNb + nNbW - 1][yNb][1][1] - CpMvLX[xNb][yNb][0][1]) << (7 - \log 2NbW)$$
$$dHorY = (CpMvLX[xNb][yNb + nNbH - 1][2][0] - CpMvLX[xNb][yNb][2][0]) << (7 - \log 2NbH)$$
$$dVerY = (CpMvLX[xNb][yNb + nNbH - 1][2][1] - CpMvLX[xNb][yNb][2][1]) << (7 - \log 2NbH$$

A second control point vector may be derived based on at least one of a first control point vector of a spatial neighboring block, a predetermined difference value, position information (xCb, yCb) of a current block, a block size (a width or a height) or position information (xNb, yNb) of a spatial neighboring block. Here, a block size may refer to a size of a current block and/or a spatial neighboring block. The difference value is the same as described in a first control point vector, so a detailed description is omitted here. However, a range and/or the number of difference values used in a process of deriving a second control point vector may be different from those of a first control point vector.

For example, a second control point vector may be derived as in Equation 3 below.

$$cpMvLX[1][0] = (mvScaleHor + dHorX * (xCb + cbWidth - xNb) + dHorY * (yCb - yNb))$$
$$cpMvLX[1][1] = (mvScaleVer + dVerX * (xCb + cbWidth - xNb) + dVerY * (yCb - yNb))$$
[Equation 3]

In Equation 3, variable mvScaleHor, mvScaleVer, dHorX, dVerX, dHorY, and dVerY are the same as described in Equation 1, and a detailed description is omitted here.

A third control point vector may be derived based on at least one of a first control point vector of a spatial neighboring block, a predetermined difference value, position information (xCb, yCb) of a current block, a block size (a width or a height) or position information (xNb, yNb) of a spatial neighboring block. Here, a block size may refer to a size of a current block and/or a spatial neighboring block. The difference value is the same as described in a first control point vector, so a detailed description is omitted here. However, a range and/or the number of difference values used in a process of deriving a third control point vector may be different from those of a first control point vector or a second control point vector.

For example, a third control point vector may be derived as in Equation 4 below.

$$cpMvLX[2][0] = (mvScaleHor + dHorX * (xCb - xNb) + dHorY * (yCb + cbHeight - yNb))$$
$$cpMvLX[2][1] = (mvScaleVer + dVerX * (xCb - xNb) + dVerY * (yCb + cbHeight - yNb))$$
[Equation 4]

In Equation 4, variable mvScaleHor, mvScaleVer, dHorX, dVerX, dHorY, and dVerY are the same as described in Equation 1, and a detailed description is omitted here. Meanwhile, through the above-described process, a n-th control point vector of a spatial candidate may be derived.

2. When a Boundary of a Current Block Borders a CTU Boundary

The first control point vector may be derived based on at least one of a motion vector (MV) of a spatial neighboring block, a predetermined difference value, position information of a current block (xCb, yCb) or position information (xNb, yNb) of a spatial neighboring block.

The motion vector may be a motion vector of a sub-block positioned at the lowermost of a spatial neighboring block. The sub-block may be positioned at the leftmost, center or rightmost side among a plurality of sub-blocks positioned at the lowermost of a spatial neighboring block. Alternatively, the motion vector may refer to an average value, a maximum value or a minimum value of a motion vector of a sub-block.

The number of difference values may be 1, 2, 3 or more. The number of difference values may be variably determined by considering an attribute of a block described above, or may be a fixed value which is pre-promised to a decoding device. The difference value may be defined as a difference value between any one and another one of a plurality of motion vectors stored in a unit of a sub-block in a spatial neighboring block. For example, the difference value may refer to a difference value between a motion vector of a bottom-right sub-block and a motion vector of a bottom-left sub-block of a spatial neighboring block.

For example, a first control point vector may be derived as in Equation 5 below.

$$cpMvLC[0][0] = (mvScaleHor + dHorX * (xCb - xNb) + dHorY * (yCb - yNb))$$
$$cpMvLC[0][1] = (mvScaleVer + dVerX * (xCb - xNb) + dVerY * (yCb - yNb))$$
[Equation 5]

In Equation 5, variable mvScaleHor and mvScaleVer may refer to a value derived by applying a shift operation by k to the motion vector (MV) or a motion vector (MV) of the above-described spatial neighboring block. Here, k may be an integer of 1, 2, 3, 4, 5, 6, 7, 8, 9 or more.

The variable dHorX and dVerX correspond to a x component and a y component of a predetermined difference value, respectively. Here, a difference value refers to a difference value between a motion vector of a bottom-right sub-block and a motion vector of a bottom-left sub-block within a spatial neighboring block. Variable dHorY and dVerY may be derived based on the variable dHorX and dVerX. The above-described variable may be derived as in Equation 6 below.

$$mvScaleHor = MvLX[xNb][yNb + nNbH - 1][0] << 7$$
$$mvScaleVer = MvLX[xNb][yNb + nNbH - 1][1] << 7$$
$$dHorX = (MvLX[xNb + nNbW - 1][yNb + nNbH - 1][0] - MvLX[xNb][yNb + nNbH - 1][0]) << (7 - \log2NbW)$$
$$dVerX = (MvLX[xNb + nNbW - 1][yNb + nNbH - 1][1] - MvLX[xNb][yNb + nNbH - 1][1]) << (7 - \log2NbW)$$
$$dHorY = -dVerX$$
$$dVerY = dHorX$$
[Equation 6]

A second control point vector may be derived based on at least one of a motion vector (MV) of a spatial neighboring block, a predetermined difference value, position information of a current block (xCb, yCb), a block size (a width or a height) or position information (xNb, yNb) of a spatial neighboring block. Here, a block size may refer to a size of a current block and/or a spatial neighboring block. For the motion vector and difference value, as described in a first control point vector, a detailed description is omitted here. However, a position, a scope and/or the number of difference values of a motion vector used in a process of deriving a second control point vector may be different from those of a first control point vector.

For example, a second control point vector may be derived as in Equation 7 below.

$$cpMvLX[1][0] = (mvScaleHor + dHorX * (xCb + cbWidth - xNb) + dHorY * (yCb - yNb))$$
$$cpMvLX[1][1] = (mvScaleVer + dVerX * (xCb + cbWidth - xNb) + dVerY * (yCb - yNb))$$
[Equation 7]

In Equation 7, variable mvScaleHor, mvScaleVer, dHorX, dVerX, dHorY, and dVerY are the same as described in Equation 5, and a detailed description is omitted here.

A third control point vector may be derived based on at least one of a motion vector (MV) of a spatial neighboring block, a predetermined difference value, position information of a current block (xCb, yCb), a block size (a width or a height) or position information (xNb, yNb) of a spatial neighboring block. Here, a block size may refer to a size of a current block and/or a spatial neighboring block. For the motion vector and difference value, as described in a first control point vector, a detailed description is omitted here. However, a position, a scope and/or the number of difference values of a motion vector used in a process of deriving a third control point vector may be different from those of a first control point vector or a second control point vector.

For example, a third control point vector may be derived as in Equation 8 below.

$$cpMvLX[2][0] = (mvScaleHor + dHorX * (xCb - xNb) + dHorY * (yCb + cbHeight - yNb))$$
$$cpMvLX[2][1] = (mvScaleVer + dVerX * (xCb - xNb) + dVerY * (yCb + cbHeight - yNb))$$
[Equation 8]

In Equation 8, variable mvScaleHor, mvScaleVer, dHorX, dVerX, dHorY, and dVerY are the same as described in Equation 5, and a detailed description is omitted here. Meanwhile, through the above-described process, a n-th control point vector of a spatial candidate may be derived.

The above-described process of deriving an affine candidate may be performed for each pre-defined spatial neighboring block. A pre-defined spatial neighboring block may include at least one of a left block, a bottom-left block, a top-right block, a top block or a top-left block of a current block.

Alternatively, the process of deriving an affine candidate may be performed respectively per group of the spatial neighboring block. Here, a spatial neighboring block may be classified into a first group including a left block and a bottom-left block and a second group including a top-right block, a top block and a top-left block.

For example, one affine candidate may be derived from a spatial neighboring block belonging to a first group. The derivation may be performed based on a predetermined priority until an available affine candidate is found. The priority may be the order of a left block→a bottom-left block or the reverse order. Whether a corresponding spatial neighboring block in a first group is a block decoded through affine model-based prediction may be determined according to the priority, and a block first decoded through affine model-based prediction may be selected as an affine candidate.

Likewise, one affine candidate may be derived from a spatial neighboring block belonging to a second group. The derivation may be performed based on a predetermined priority until an available affine candidate is found. The priority may be the order of a top-right block→a top block→a top-left block or the reverse order. Whether a corresponding spatial neighboring block in a second group is a block decoded through affine model-based prediction may be determined according to the priority, and a block first decoded through affine model-based prediction may be selected as an affine candidate.

The above-described embodiment may be applied equally/similarly to a temporal neighboring block. Here, a temporal neighboring block belongs to a different picture from a current block, but may be a block at the same position as a current block. A block at the same position may be a block including a position of a top-left sample of a current block, a center position or a position of a sample adjacent to a bottom-right sample of a current block.

Alternatively, a temporal neighboring block may refer to a block at a position shifted by a predetermined disparity vector from the block at the same position. Here, a disparity vector may be determined based on a motion vector of any one of spatial neighboring blocks of a current block described above.

FIG. 7 shows a method of deriving a constructed candidate based on a combination of motion vectors of a spatial/temporal neighboring block according to an embodiment of the present disclosure.

A constructed candidate of the present disclosure may be derived based on a combination of at least two of control point vectors (hereinafter, referred to as a control point vector (cpMVCorner[n])) corresponding to each corner of a current block. Here, n may be 0, 1, 2 or 3.

The control point vector (cpMVCorner[n]) may be derived based on a motion vector of a spatial neighboring block and/or a temporal neighboring block. Here, a spatial neighboring block may include at least one of a first neighboring block (A, B or C) adjacent to a top-left sample of a current block, a second neighboring block (D or E) adjacent to a top-right sample of a current block or a third neighboring block (F or G) adjacent to a bottom-left sample of a current block. As a temporal neighboring block is a block belonging to a different picture from a current block, it may refer to a block at the same position as a current block (hereinafter, referred to as a fourth neighboring block (Col)). Here, a fourth neighboring block may refer to a block (H, I or J) including a position of a top-left sample, a top-right sample or a bottom-left sample of a current block or a block adjacent to a position of a bottom-right sample of a current block.

A first neighboring block may refer to a neighboring block at the top-left (A), the top (B) or the left (C) of a current block. Whether a motion vector of neighboring block A, B and C is available may be determined according to a predetermined priority, and a control point vector may be determined by using a motion vector of an available neighboring block. The availability determination may be performed until a neighboring block with an available motion vector is found. Here, a priority may be in the order of A→B→C. However, it is not limited thereto, and may be in the order of A→C→B, C→A→B, B→A→C.

A second neighboring block may refer to a neighboring block on the top (D) or the top-right (E) of a current block. Likewise, whether a motion vector of neighboring block D and E is available may be determined according to a predetermined priority, and a control point vector may be determined by using a motion vector of an available neighboring block. The availability determination may be performed until a neighboring block with an available motion vector is found. Here, a priority may be in the order of D→E or E→D.

A third neighboring block may refer to a neighboring block on the left (F) or the bottom-left (G) of a current block. Likewise, whether a motion vector of a neighboring block is available may be determined according to a predetermined priority, and a control point vector may be determined by using a motion vector of an available neighboring block. The availability determination may be performed until a neighboring block with an available motion vector is found. Here, a priority may be in the order of G→F or F→G.

For example, a first control point vector (cpMVCorner[0]) may be configured as a motion vector of a first neighboring block, a second control point vector (cpMVCorner[1]) may be configured as a motion vector of a second neighboring block and a third control point vector (cpMVCorner[2]) may be configured as a motion vector of a third neighboring block. A fourth control point vector (cpMVCorner[3]) may be configured as a motion vector of a fourth neighboring block.

Alternatively, a first control point vector may be derived by using a motion vector of at least one of a first neighboring block or a fourth neighboring block, and herein, a fourth neighboring block may be a block (H) including a position of a top-left sample. A second control point vector may be derived by using a motion vector of at least one of a second neighboring block or a fourth neighboring block. Here, a fourth neighboring block may be a block (I) including a position of a top-right sample. A third control point vector may be derived by using a motion vector of at least one of a third neighboring block or a fourth neighboring block. Here, a fourth neighboring block may be a block (J) including a position of a bottom-left sample.

Alternatively, any one of the first to fourth control point vector may be derived based on the other. For example, a second control point vector may be derived by applying a predetermined offset vector to a first control point vector. An offset vector may be a difference vector between a third control point vector and a first control point vector or may be derived by applying a predetermined scaling factor to the difference vector. A scaling factor may be determined based on at least one of a width or a height of a current block and/or a neighboring block.

Through a combination of at least two of the above-described first to fourth control point vector, K constructed candidates (ConstK) according to the present disclosure may be determined. A value of K may be an integer of 1, 2, 3, 4, 5, 6, 7 or more. A value of K may be derived based on information signaled from an encoding device or may be a pre-promised value in a decoding device. The information may include information indicating the maximum number of constructed candidates included in a candidate list.

Specifically, a first constructed candidate (Const1) may be derived by combining a first to third control point vector. For example, a first constructed candidate (Const1) may have a control point vector as in Table 2 below. Meanwhile, only when reference picture information of a first neighboring block is the same as reference picture information of a second and third neighboring block, there may be a limit that a control point vector is constructed as in Table 2. Here, reference picture information may refer to a reference picture index showing a position of a corresponding reference picture in a reference picture list or may refer to a picture order count (POC) value showing output order.

TABLE 2

| Idx | Control Point Vector |
|---|---|
| 0 | cpMvCorner[ 0 ] |
| 1 | cpMvCorner[ 1 ] |
| 2 | cpMvCorner[ 2 ] |

A second constructed candidate (Const2) may be derived by combining a first, second and fourth control point vector. For example, a second constructed candidate (Const2) may have a control point vector as in Table 3 below. Meanwhile, only when reference picture information of a first neighboring block is the same as reference picture information of a second and fourth neighboring block, there may be a limit that a control point vector is constructed as in Table 3. Here, reference picture information is as described above.

TABLE 3

| Idx | Control Point Vector |
|---|---|
| 0 | cpMvCorner[ 0 ] |
| 1 | cpMvCorner[ 1 ] |
| 2 | cpMvCorner[ 3 ] + cpMvCorner[ 1 ] − cpMvCorner[ 0 ]<br>cpMvCorner[ 3 ] + cpMvCorner[ 0 ] − cpMvCorner[ 1 ] |

A third constructed candidate (Const3) may be derived by combining a first, third and fourth control point vector. For example, a third constructed candidate (Const3) may have a control point vector as in Table 4 below. Meanwhile, only when reference picture information of a first neighboring block is the same as reference picture information of a third and fourth neighboring block, there may be a limit that a control point vector is constructed as in Table 4. Here, reference picture information is as described above.

TABLE 4

| Idx | Control Point Vector | Control Point Vector |
|---|---|---|
| 0 | cpMvCorner[0] | cpMvCorner[0] |
| 1 | cpMvCorner[3] + cpMvCorner[0] − cpMvCorner[2] | cpMvCorner[2] |
| 2 | cpMvCorner[2] | cpMvCorner[0] + cpMvCorner[3] − cpMvCorner[2] |

A fourth constructed candidate (Const4) may be derived by combining a second, third and fourth control point vector. For example, a fourth constructed candidate (Const4) may have a control point vector as in Table 5 below. Meanwhile, only when reference picture information of a second neighboring block is the same as reference picture information of a third and fourth neighboring block, there may be a limit that a control point vector is constructed as in Table 5. Here, reference picture information is as described above.

TABLE 5

| Idx | Control Point Vector | Control Point Vector |
|---|---|---|
| 0 | cpMvCorner[1] + cpMvCorner[2] − cpMvCorner[3] | cpMvCorner[2] |
| 1 | cpMvCorner[1] | cpMvCorner[3] |
| 2 | cpMvCorner[2] | cpMvCorner[3] + cpMvCorner[2] − cpMvCorner[1] |

A fifth constructed candidate (Const5) may be derived by combining a first and second control point vector. For example, a fifth constructed candidate (Const4) may have a control point vector as in Table 6 below. Meanwhile, only when reference picture information of a first neighboring block is the same as reference picture information of a second neighboring block, there may be a limit that a control point vector is constructed as in Table 6. Here, reference picture information is as described above.

TABLE 6

| Idx | Control Point Vector |
|---|---|
| 1 | cpMvCorner[ 0 ] |
| 2 | cpMvCorner[ 1 ] |

A sixth constructed candidate (Const6) may be derived by combining a first and third control point vector. For example, a sixth constructed candidate (Const6) may have a control point vector as in Table 7 below. Meanwhile, only when reference picture information of a first neighboring block is the same as reference picture information of a third neighboring block, there may be a limit that a control point vector is constructed as in Table 7. Here, reference picture information is as described above.

TABLE 7

| Idx | Control Point Vector | Control Point Vector |
|---|---|---|
| 1 | cpMvCorner[ 0 ] | cpMvCorner[ 0 ] |
| 2 | cpMvCorner[ 2 ] | cpMvCorner[ 1 ] |

In Table 6, cpMvCorner[1] may be a second control point vector derived based on the first and third control point vector. A second control point vector may be derived based on at least one of a first control point vector, a predetermined difference value or a size of a current/neighboring block. For example, a second control point vector may be derived as in Equation 9 below.

$$cpMvCorner[1][0] = (cpMvCorner[0][0] \ll 7) + ((cpMvCorner[2][1] - cpMvCorner[0][1]) \ll (7 + \mathrm{Log2}(cbHeight/CbWidth)))$$

$$cpMvCorner[1][1] = (cpMvCorner[0][1] \ll 7) + ((cpMvCorner[2][0] - cpMvCorner[0][0]) \ll (7 + \mathrm{Log2}(cbHeight/CbWidth)))$$

[Equation 9]

In the above-described K constructed candidates (ConstK), a value of K does not limit a position or a priority of a constructed candidate arranged in a candidate list.

In addition, all of the first to sixth constructed candidate may be included in the candidate list or only some of them may be included in a candidate list.

For example, when it is determined that a current block uses three control point vectors, only a constructed candidate generated through a combination of three of a first to fourth control point vector may be used. When it is determined that a current block uses two control point vectors, a constructed candidate generated through a combination of at least two of a first to fourth control point vector may be used or a constructed candidate generated through only a combination of two of a first to fourth control point vector may be used.

Alternatively, only some constructed candidates may be included in a candidate list by considering the maximum number of affine candidates included in a candidate list. Here, the maximum number may be determined based on maximum number information signaled from an encoding device or may be variably determined by considering an attribute of a current block described above. In this case, a K value of a constructed candidate (ConstK) may refer to a priority inserted into a candidate list.

Meanwhile, when a difference value between two control point vectors belonging to the constructed candidate is smaller than a predetermined threshold, a corresponding constructed candidate may not be inserted into a candidate list. A difference value between the two control point vectors may be divided into a difference value in a horizontal direction and a difference value in a vertical direction. Here, a difference value in a horizontal direction may refer to a difference value between a first control point vector 710 and a second control point vector 720 and a difference value in a vertical direction may refer to a difference value between a first control point vector 710 and a third control point vector 730. The threshold value may refer to 0 or a vector in a pre-promised size in an encoding/decoding device.

Figure 8:
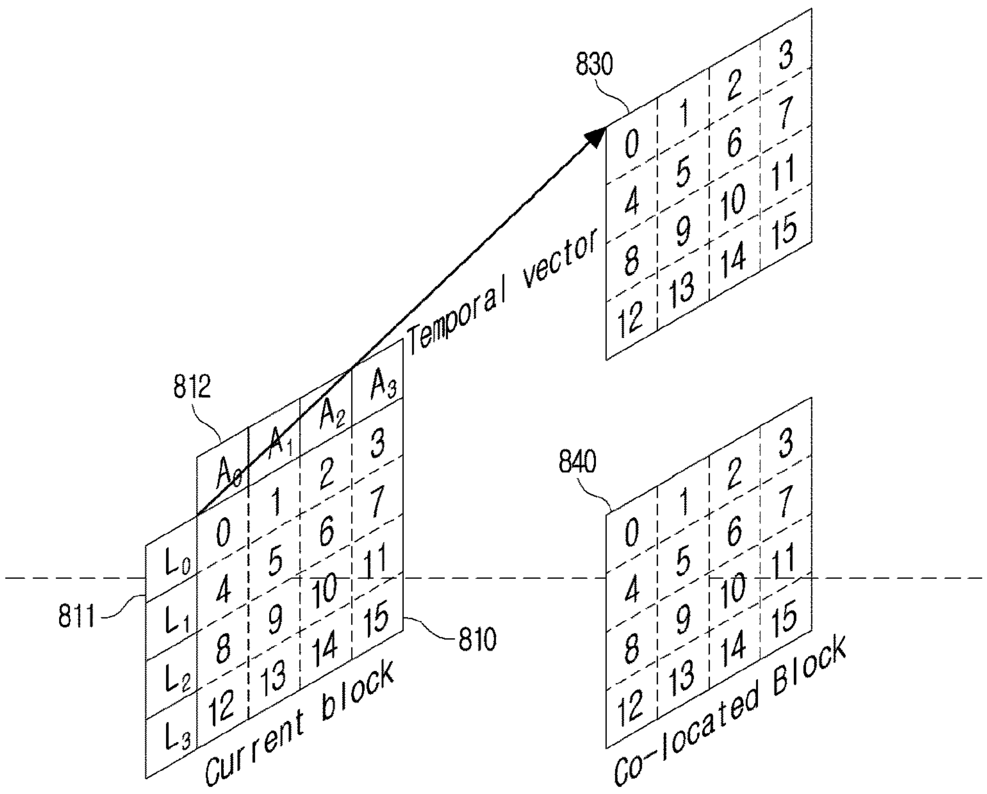
FIG. 8 shows a method of deriving motion information of a sub-block-based temporal candidate according to an embodiment of the present disclosure.

FIG. 8 shows a method of deriving motion information of a sub-block-based temporal candidate according to an embodiment of the present disclosure.

Motion information of a temporal candidate according to the present disclosure may be derived from motion information of a collocated block. The motion information may be derived in a unit of a sub-block.

Here, as a collocated block is a block belonging to a picture (i.e., a collocated picture) different from a current block 810, it may be a block 840 at the same position as a current block or a block 830 at a position shifted by a temporal vector from a position of a current block. The temporal vector may be determined based on a motion vector of a spatial neighboring block of a current block. A spatial neighboring block may refer to a block adjacent to at least one of the left, bottom-left, top, top-right or top-left of a current block. A temporal vector may be determined by using only a neighboring block at a pre-promised position in an encoding/decoding device. For example, a pre-promised position may be the left 811 or the top 812 or the left 811 and the top 812. When there are a plurality of neighboring blocks on the left, a block positioned at any one of the lowermost, uppermost or center among a plurality of neighboring blocks may be used. When there are a plurality of neighboring blocks on the top, a block positioned at any one of the leftmost, rightmost or center among a plurality of neighboring blocks may be used.

In deriving a sub-block-based temporal candidate, the current block and/or collocated block may be partitioned into a plurality of sub-blocks.

Here, a sub-block may have a fixed size/shape that is pre-promised in an encoding/decoding device. For example, the sub-block is expressed as a N×M block, and a value of N and M may be an integer of 4, 8 or more. The sub-block may be square (N=M) or rectangular (N>M, N<M). It may refer to a size. Alternatively, an encoding device may encode and signal information on a size/a shape of the sub-block and a decoding device may determine a size/a shape of a sub-block based on signaled information.

Alternatively, a current block and/or a collocated block may be partitioned into a plurality of sub-blocks based on a predetermined number. Here, a number may be a fixed number which is pre-promised in an encoding/decoding device or may be variably determined by considering a block size/shape. Alternatively, the number may be determined based on number information signaled in an encoding device.

Hereinafter, a method of deriving motion information of a temporal candidate in a unit of a sub-block is described. A motion vector of a temporal candidate may be configured as a motion vector stored per sub-block of a collocated block. A reference picture index of a temporal candidate may be configured as a value (e.g., 0) which is predefined in an encoding/decoding device. Alternatively, a reference picture index of the temporal candidate may be configured as a reference picture index of a collocated block or a reference picture index of a top-left sub-block among sub-blocks. Alternatively, like a motion vector, a reference picture index of a temporal candidate may be also configured as a reference picture index stored per sub-block.

However, when there is an unavailable sub-block among sub-blocks belonging to a collocated block, a motion vector of the unavailable sub-block may be replaced with a motion vector of an available sub-block within a collocated block. Here, an available sub-block may refer to a block adjacent to any one of the left, right, top or bottom of an unavailable sub-block.

Alternatively, an available sub-block may be a block at a pre-promised position in an encoding/decoding device. For example, a pre-promised position may be a position of a bottom-right sub-block within a collocated block or may be a position of a sub-block including a center position of a collocated block. The above-described sub-block-based temporal candidate may be added to a candidate list only when the available sub-block exists. Alternatively, the above-described sub-block-based temporal candidate may be added to a candidate list only when a sub-block at the pre-promised position is available.

Figure 9:
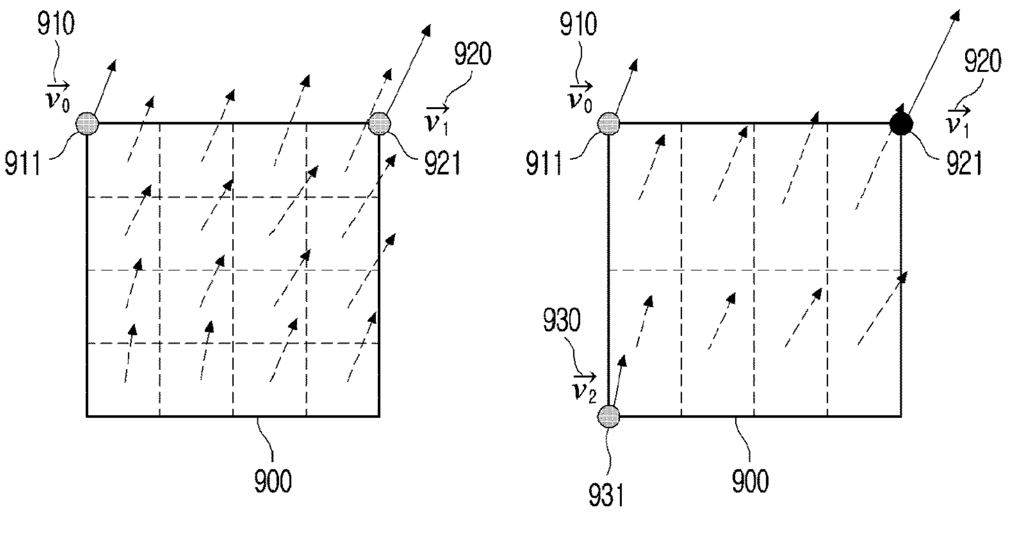
FIG. 9 shows a method of deriving a motion vector in a unit of a sub-block according to an embodiment of the present disclosure.

FIG. 9 shows a method of deriving a motion vector in a unit of a sub-block according to an embodiment of the present disclosure.

As described above, a motion vector of a current block may be derived by using a control point vector of a current block. In this case, a current block may be partitioned into a plurality of sub-blocks and a motion vector may be derived in a unit of a sub-block.

A size/a shape of the sub-block may be a fixed size/shape which is pre-defined in a decoding device. For example, a size/a shape of a sub-block may be square such as 4×4, 8×8, 16×16, etc. or may be rectangular such as 2×4, 2×8, 4×8, 4×16, etc. Alternatively, the sub-block may be defined as a block where a sum of a width and a height is an integer of 8, 12, 16 or more. Alternatively, the sub-block may be defined as a block where a product of a width and a height is an integer of 16, 32, 64 or more.

Alternatively, a size/a shape of a sub-block may be variably derived based on an attribute of a block described above. For example, when a size of a current block is equal to or greater than a predetermined threshold size, a current block may be partitioned in a unit of a first sub-block (e.g., 8×8, 16×16), and otherwise, a current block may be partitioned in a unit of a second sub-block (e.g., 4×4).

Alternatively, information on a size/a shape of a sub-block may be encoded and signaled in an encoding device. The information shows at least one of a size or a shape of a sub-block, which may be signaled at at least one level of a sequence, a picture, a tile group, a tile or a CTU.

Alternatively, a size/a shape of the sub-block may be calculated by using a control point vector of the current block as in Equation 10 below.

$$\begin{cases} K = \text{clip3}\left(4,\ w,\ \dfrac{w \times \text{mv\_precision}}{\max(\text{abs}(v_{1x} - v_{0x}),\ \text{abs}(v_{1y} - v_{0y}))}\right) \\ L = \text{clip3}\left(4,\ h,\ \dfrac{h \times \text{mv\_precision}}{\max(\text{abs}(v_{2x} - v_{0x}),\ \text{abs}(v_{2y} - v_{0y}))}\right) \end{cases} \quad \text{[Equation 10]}$$

As shown in FIG. 8, a control point representing a current block 900 may include a top-left position 911 and a top-right position 921. However, it is not limited thereto, and the control point may include three points of a top-left position 911, a top-right position 921 and a bottom-left position 931 or may further include multiple additional points.

When two control points 911 and 921 are used, a motion vector for each sub-block of a current block may be derived by using at least one of a first control point vector 910 corresponding to a first control point 911, a second control point vector 920 corresponding to a second control point 921, a position (x, y) of a sub-block or a size (w or h) of a current block. For example, a motion vector of each sub-block may be derived as in Equation 10 below.

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \quad \text{[Equation 11]}$$

When three control points are used, a motion vector for each sub-block of a current block may be derived by using at least one of a first control point vector 910 corresponding to a first control point 911, a second control point vector 920 corresponding to a second control point 921, a third control point vector 930 corresponding to a third control point 931, a position (x, y) of a sub-block or a size (w or h) of a current block. In this case, a difference vector between a second control point vector and a first control point vector may be used and a difference vector between a third control point vector and a first control point vector may be used. The difference vector may be calculated for each of a horizontal direction (a x-axis direction) and a vertical direction (a y-axis direction).

Figure 10:
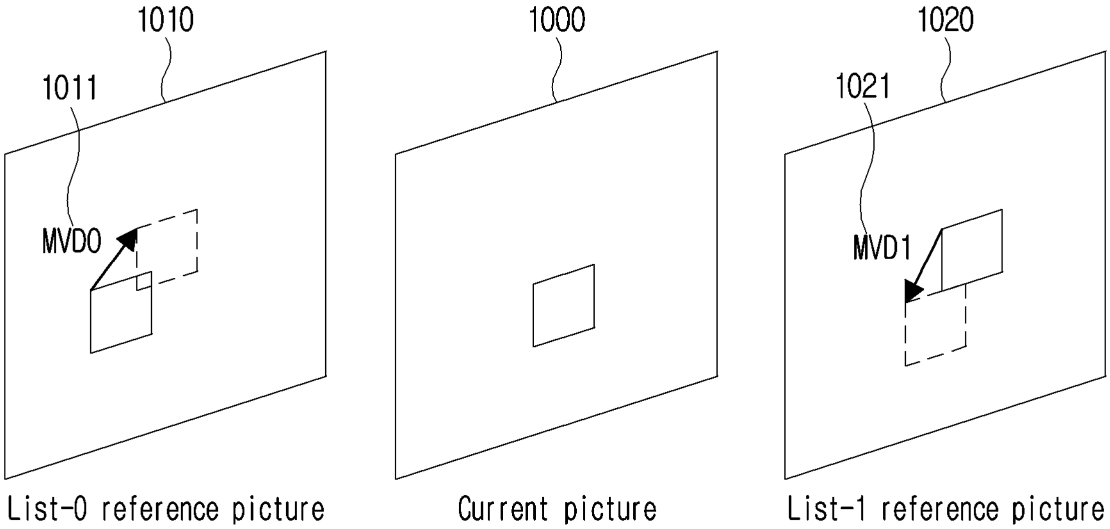
FIG. 10 is a diagram for describing a symmetric motion vector difference-based inter prediction method to which an embodiment of the present disclosure may be applied.

FIG. 10 is a diagram for describing a symmetric motion vector difference-based inter prediction method to which an embodiment of the present disclosure may be applied.

Referring to FIG. 10, when bidirectional prediction (or bi-prediction) is applied, a symmetric motion vector difference (SMVD) may be used to increase coding efficiency. In this case, signaling for some of motion information may be omitted. For example, when a SMVD is applied to a current block, at least one of information on a L0 reference picture 1010 index (refidxL0), information on a L1 reference picture 1020 index (refidxL1) or information on a L1 motion vector difference 1021 may not be signaled from an encoding device to a decoding device, but may be derived from a decoding device.

When a MVP (or AMVP) mode and bidirectional prediction are applied to a current block, a flag indicating whether to apply a SMVD (ex. a SMVD flag or a sym_mvd_flag syntax element) may be signaled. When a value of the flag is 1, a decoding device may determine that a SMVD is applied to the current block. When a value of the flag is 0, a decoding device may determine that a SMVD is not applied to the current block and parse at least one of information on a LO reference picture 1010 index (refidxL0), information on a L1 reference picture 1020 index (refidxL1) or information on a L1 motion vector difference 1021 from a bitstream.

As an example, when a SMVD mode is applied (i.e., when a value of SMVD flag information is 1), information on mvp_l0_flag, mvp_l1_flag, and MVDL0 (1011) may be explicitly signaled, and as described above, signaling of information on refidxL0, information on refidxL1 and information on MVDL1 (1021) may be omitted and derived internally. For example, refidxL0 may be derived as an index indicating a previous reference picture closest to the current picture 1000 in POC order within reference picture list 0 (which may be referred to as reference list 0, list 0 or L0). In addition, for example, MVDL1 (1021) may be derived based on MVDL0 (1011). For example, MVDL1 (1021) may have the same size and an opposite sign as MVDL0 (1011).

And, refidxL1 may be derived as an index indicating a next reference picture closest to the current picture 1000 in POC order within reference picture list 1 (which may be referred to as reference list 1, list 1 or L1). Alternatively, for example, refidxL0 and refidxL1 may be driven to 0, respectively. Alternatively, for example, the refidxL0 and refidxL1 may be derived as the minimum index having the same POC difference in relation to a current picture 1000, respectively.

Specifically, for example, when [POC of a current picture 1000]−[POC of a first reference picture 1010 indicated by refidxL0] is referred to as a first POC difference and [POC of a second reference picture 1020 indicated by refidxL1]−[POC of a current picture 1000] is referred to as a second POC difference, a value of refidxL0 indicating the first reference picture 1010 may be derived as a value of refidxL0 of the current block and a value of refidxL1 indicating the second reference picture 1020 may be derived as a value of refidxL1 of the current block only when the first POC difference is the same as the second POC difference. In addition, for example, when there are a plurality of sets in which the first POC difference is the same as the second POC difference, refidxL0 and refidxL1 of a set with the minimum difference may be derived as refidxL0 and refidxL1 of a current block.

As an example, a L1 motion vector difference may be derived as a value whose size is the same as and sign is opposite to that of a L0 motion vector difference. For example, a final motion vector for a current block may be derived as in Equation 12 below.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases} \quad \text{[Equation 12]}$$

Figure 11:
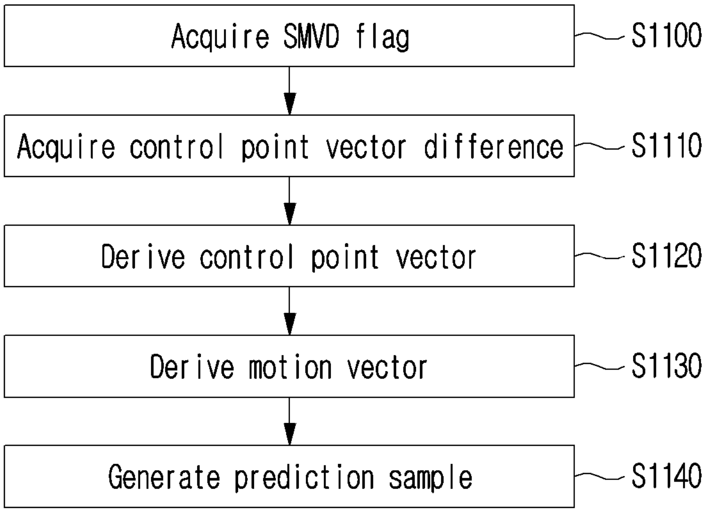
FIG. 11 shows an image decoding method performed by a decoding device according to an embodiment of the present disclosure.

FIG. 11 shows an image decoding method performed by a decoding device according to an embodiment of the present disclosure.

Referring to FIG. 11, a decoding device (i.e., a decoder) may obtain a flag indicating whether a SMVD is used for a current block (S1100). As an example, a current block may be a coding unit, a coding block, a transform unit, a transform block, a prediction unit or a prediction block. In addition, as an example, a current block may be a leaf node block in a tree-based block partition structure. In addition, in the present disclosure, the flag may be referred to as a symmetric motion vector difference flag or a SMVD flag, but of course, the flag is not limited thereto.

The present disclosure proposes a method of reducing signaling overhead and improving image compression performance by signaling a bidirectional motion vector difference per each control point in performing prediction using an affine model. In the present disclosure, prediction using an affine model may be referred to as affine model prediction, affine inter prediction, affine prediction, etc. As an example, affine prediction may be divided into an affine merge mode and an affine inter mode.

When an affine inter mode is applied, unlike an affine merge mode, not only predictor (or candidate) information on a motion vector at each control point, but also a motion vector difference are signaled. For example, when an affine parameter type (or an affine motion model) is a 4-parameter, signaling for a total of four motion vector differences is required in bidirectional prediction. In addition, when an affine parameter type is a 6-parameter, signaling for a total of six motion vector differences is required in bidirectional prediction. For this reason, in an affine inter mode, the bit amount due to signaling of a motion vector difference is very large. Accordingly, an embodiment of the present disclosure describes a method for improving the above-described problem.

In other words, according to an embodiment of the present disclosure, a SMVD may be used to derive a bidirectional control point motion vector in affine prediction. Specifically, only a motion vector difference in any one direction may be signaled by using a symmetric feature of bidirectional prediction and a motion vector difference in another direction may be derived based on a signaled motion vector difference. Through this, the amount of signaling data for a motion vector difference may be reduced by half. In an embodiment, a method described above in FIG. 10 may be applied substantially in the same way in determining motion information of a control point.

A decoding device may obtain a control point vector difference of a current block based on a flag obtained in S1100 (S1110). A control point vector refers to a motion vector of a control point for an affine model, and may be defined for a corner position of a block (e.g., a position of at least one of a top-left, top-right, bottom-left or bottom-right corner). In the present disclosure, a control point vector may be referred to as a control point motion vector.

As an example, when a SMVD is applied, i.e., when a flag obtained in S1100 indicates that a SMVD is used, a control point vector difference may be obtained by deriving a control point vector difference in a first direction based on a control point vector difference in a second direction. As an example, a control point vector difference in the first direction may be derived as a value whose size is the same as and sign is opposite to a control point vector difference in the second direction.

In the traditional technology (e.g., VVC), a SMVD is applied only to a non-affine block. However, according to an embodiment of the present disclosure, a SMVD may be applied even when a current block is an affine block, and as an example, a syntax as in Table 8 below may be defined. Here, an affine block represents a block that is encoded/decoded by affine prediction.

TABLE 8

| | |
|---|---|
| if( sh_slice_type = = B ) | |
| inter_pred_idc[ x0 ][ y0 ] | ae(v) |
| if( sps_affine_enabled_flag && cbWidth >= 16 && cbHeight >= 16 ) { | |

TABLE 8-continued

| | |
|---|---|
| inter_affine_flag[ x0 ][ y0 ] | ae(v) |
| if( sps_6param_affine_enabled_flag && inter_affine_flag[ x0 ][ y0 ] ) | |
| cu_affine_type_flag[ x0 ][ y0 ] | ae(v) |
| } | |
| if( sps_smvd_enabled_flag && !ph_mvd_l1_zero_flag && inter pred_idc[ x0 ][ y0 ] = = PRED_BI && ~~!inter_affine_flag[ x0 ][ y0 ] &&~~ RefIdxSymL0 > −1 && RefIdxSymL1 > −1 ) | |
| sym_mvd_flag[ x0 ][ y0 ] | ae(v) |
| if( inter_pred_idc[ x0 ][ y0 ] != PRED_L1 ) { | |
| if( NumRefIdxActive[ 0 ] > 1 && !sym_mvd_flag[ x0 ][ y0 ] ) | |
| ref_idx_l0[ x0 ][ y0 ] | ae(v) |
| mvd_coding( x0, y0, 0, 0 ) | |
| if( MotionModelIdc[ x0 ][ y0 ] > 0 ) | |
| mvd_coding( x0, y0, 0, 1 ) | |
| if(MotionModelIdc[ x0 ][ y0 ] > 1 ) | |
| mvd_coding( x0, y0, 0, 2 ) | |
| mvp_l0_flag[ x0 ][ y0 ] | ae(v) |
| } else { | |
| MvdL0[ x0 ][ y0 ][ 0 ] = 0 | |
| MvdL0[ x0 ][ y0 ][ 1 ] = 0 | |
| } | |
| if( inter_pred_idc[ x0 ][ y0 ] != PRED_L0 ) { | |
| if( NumRefIdxActive[ 1 ] > 1 && !sym_mvd_flag[ x0 ][ y0 ] ) | |
| ref_idx_l1[ x0 ][ y0 ] | ae(v) |
| if( ph_mvd_l1_zero_flag && inter_pred_idc[ x0 ][ y0 ] = = PRED_BI ) { | |
| MvdL1[ x0 ][ y0 ][ 0 ] = 0 | |
| MvdL1[ x0 ][ y0 ][ 1 ] = 0 | |
| MvdCpL1[ x0 ][ y0 ][ 0 ][ 0 ] = 0 | |
| MvdCpL1[ x0 ][ y0 ][ 0 ][ 1 ] = 0 | |
| MvdCpL1[ x0 ][ y0 ][ 1 ][ 0 ] = 0 | |
| MvdCpL1[ x0 ][ y0 ][ 1 ][ 1 ] = 0 | |
| MvdCpL1[ x0 ][ y0 ][ 2 ][ 0 ] = 0 | |
| MvdCpL1[ x0 ][ y0 ][ 2 ][ 1 ] = 0 | |
| } else { | |
| if( sym_mvd_flag[ x0 ][ y0 ] ) { | |
| MvdL1[ x0 ][ y0 ][ 0 ] = −MvdL0[ x0 ][ y0 [ 0 ] | |
| MvdL1[ x0 ][ y0 ][ 1 ] = −MvdL0[ x0 ][ y0 ][ 1 ] | |
| if( MotionModelIdc[ x0 ][ y0 ] > 0 ) { | |
| MvdCpL1[ x0 ][ y0 ][ 1 ][ 0 ] = −MvdCpL0[ x0 ][ y0 ][ 1 ][ 0 ] | |
| MvdCpL1[ x0 ][ y0 ][ 1 ][ 1 ] = −MvdCpL0[ x0 ][ y0 ][ 1 ][ 1 ] | |
| } | |
| if( MotionModelIdc[ x0 ][ y0 ] > 1 ) { | |
| MvdCpL1[ x0 ][ y0 ][ 2 ][ 0 ] = −MvdCpL0[ x0 ][ y0 ][ 2 ][ 0 ] | |
| MvdCpL1[ x0 ][ y0 ][ 2 ][ 1 ] = −MvdCpL0[ x0 ][ y0 ][ 2 ][ 1 ] | |
| } | |
| } else { | |
| mvd_coding( x0, y0, 1, 0 ) | |
| if( MotionModelIdc[ x0 ][ y0 ] > 0 ) | |
| mvd_coding( x0, y0, 1, 1 ) | |
| if(MotionModelIdc[ x0 ][ y0 ] > 1 ) | |
| mvd_coding( x0, y0, 1, 2 ) | |
| } | |
| mvp_l1_flag[ x0 ][ y0 ] | ae(v) |
| } else { | |
| MvdL1[ x0 ][ y0 ][ 0 ] = 0 | |
| MvdL1[ x0 ][ y0 ][ 1 ] = 0 | |
| } | |

As in a syntax of Table 8, a condition limiting parsing of sym_mvd_flag, a syntax element indicating whether to apply (or use) a SMVD, to a case of an affine block may be deleted. In other words, even when inter_affine_flag indicates that affine prediction is applied to a current block, sym_mvd_flag may be parsed to check whether a SMVD is applied to an affine block.

Since a SMVD is also applied to an affine block according to an embodiment of the present disclosure, a L0 motion vector difference may decoded in deriving a control point vector difference and a L1 motion vector difference may be derived by using a decoded motion vector difference in a first direction. Specifically, as in an syntax of Table 8, when a SMVD is applied, a L1 motion vector difference of a first control point may be determined to be a value whose size is the same as and sign is opposite to a L0 motion vector difference. In addition, when a motion model index (MotionModelIdc) is greater than 0, a L1 motion vector difference of a second control point may be determined to be a value whose size is the same as and sign is opposite to a L0 motion vector difference. In addition, when a motion model index is greater than 1, a L1 motion vector difference of a third control point may be determined to be a value whose size is the same as and sign is opposite to a L0 motion vector difference.

A decoding device may derive a control point vector of a current block based on a control point vector difference obtained in S1110 (S1120). A decoding device may derive a control point vector by adding a control point vector predictor to a control point vector difference. In order to derive a control point vector predictor, a candidate list including a plurality of affine candidates may be configured as previously described in FIG. 5. In other words, as an example, a step of configuring a candidate list by a decoding device may be added. In addition, as an example, the candidate list may include a merge list, an affine list, a merge candidate list, an affine merge candidate list, an affine candidate list, a sub-block-based candidate list, a sub-block-based merge candidate list, a sub-block-based affine candidate list, etc. The candidate list may include at least one affine model-based candidate (hereinafter, referred to as an affine candidate).

In addition, an affine candidate may include at least one of a spatial candidate, a temporal candidate or a constructed candidate. Here, a spatial candidate may be derived from a vector of a neighboring block spatially adjacent to a current block, and a temporal candidate may be derived from a vector of a neighboring block temporally adjacent to a current block. Here, the neighboring block may refer to a block encoded by an affine model. The vector may refer to a motion vector or a control point vector. In addition, a constructed candidate may be a candidate constructed based on a combination of motion vectors of a spatial/temporal neighboring block as previously described in FIG. 7.

An affine candidate used to derive a control point vector may be specified based on a candidate list and a candidate index. And, a control point vector predictor may be derived by using a specified affine candidate. In other words, as an example, a step of obtaining (or parsing) a candidate index from a bitstream may be added.

Generally, a motion vector is calculated by adding a motion vector difference to a motion vector predictor (or a prediction value), but each control point vector of an affine block may be calculated as in Equation 13 below. The following equation assumes that there are three control points, i.e., that an affine parameter type is a 6-parameter type, but the present disclosure is not limited thereto, and it may be also applied substantially in the same way even in case of a 6-parameter type with 4 control points or a 4-parameter type with 2 control points.

$$CPMV_0 = CPMVP_0 + CPMVD_0 \qquad \text{[Equation 13]}$$

$$CPMV_1 = CPMVP_1 + CPMVD_0 + CPMVD_1$$

$$CPMV_2 = CPMVP_2 + CPMVD_0 + CPMVD_2$$

Referring to Equation 13, since a motion vector difference between control point vectors has similarity, only a difference ($CPMVD_1$, $CPMVD_2$) between a motion vector difference ($CPMVD_0$) of a first control point (i.e., a control point at a top-left corner position) and a motion vector difference of a second control point (i.e., a control point at a top-right corner position) and a third control point (i.e., a control point at a bottom-left corner position) may be signaled from an encoding device to a decoding device. In other words, a first control point vector may be determined by adding a first control point vector predictor and a first control point vector difference, a second control point vector may be determined by adding a second control point vector predictor, a first control point vector difference and a second control point vector difference. and a third control point vector may be determined by adding a third control point vector predictor, a first control point vector difference and a third control point vector difference.

In a process of deriving a SMVD of an affine block described in this embodiment, a first control point vector difference of L1 may be derived as a value that mirrors a first control point vector difference of L0 and a second control point vector difference and a third control point vector difference of L1 may be derived as a value that mirrors a second control point vector difference and a third control point vector difference of L0, respectively. In Table 8, a control point vector differences between L0 and L1 may be expressed as MvdCpL0 and MvdCpL1, respectively. In the present disclosure, mirroring may show a method of configuring (or determining, deriving) a value with the same size and an opposite sign.

A decoding device may derive a motion vector of the current block based on a control point vector of a current block (S1130). A decoding device may derive a motion vector in a unit of a sub-block or in a unit of a pixel within a current block based on a control point vector of a current block. In this case, an embodiment previously described in FIGS. 4 to 9 may be applied.

As an embodiment, a motion vector of a current block may be derived in a unit of a sub-block within the current block based on a control point vector of the current block. To this end, the current block may be partitioned into a plurality of N×M sub-blocks. Here, a N×M subblock may be rectangular (N>M or N<M, i.e., non-square) or square (N=M, i.e., square). The N and M value may be 4, 8, 16, 32 or more.

A decoding device may generate a prediction sample of the current block by using a motion vector of a current block (S1140). A decoding device may derive a motion vector based on a derived control point vector and generate a prediction sample based on a derived motion vector. In this case, an embodiment previously described in FIGS. 4 to 9 may be applied.

As an example, a reference block may be specified by using a motion vector of a current block. The reference block may be individually specified per sub-block of a current block. A reference block of each sub-block may belong to one reference picture. In other words, a sub-block belonging to a current block may share one reference picture. Alternatively, a reference picture index may be independently configured per sub-block of a current block.

In addition, in an embodiment of the present disclosure, an affine block may support various forms of affine types. When VVC is taken as an example, two types, a 4-parameter and a 6-parameter, may be defined. In addition, in the present disclosure, a 8-parameter type may be defined. As the number of parameters increases, various forms of transform of a block may be expressed, while the amount of information required for signaling may increase.

As described above, when a SMVD for an affine block is applied, MVD of L1 may be used by being derived without signaling, so the amount of bits generated may be reduced. Accordingly, in this embodiment, for bidirectional prediction that a SMVD is applied to an affine block, a method of making a 8-parameter type motion model available is proposed. According to an embodiment of the present disclosure, prediction accuracy may be increased while reducing the amount of information required for signaling by using a 8-parameter type with a SMVD. To support this, a syntax as in Table 9 below may be defined.

TABLE 9

| | |
|---|---|
| if( sh_slice_type = = B ) | |
| inter_pred_idc[ x0 ][ y0 ] | ae(v) |
| if( sps_affine_enabled_flag && cbWidth >= 16 && cbHeight >= 16 ) { | |
| inter_affine_flag[ x0 ][ y0 ] | ae(v) |
| if( sps_6param_affine_enabled_flag && inter_affine_flag[ x0 ][ y0 ] ) | |
| cu_affine_type_ ~~!inter_affine_flag[ x0 ][ y0 ] &&~~ idc[ x0 ][ y0 ] | ae(v) |
| } | |
| if( sps_smvd_enabled_flag && !ph_mvd_l1_zero_flag && inter_pred_idc[ x0 ][ y0 ] = = PRED_BI && ~~!inter_affine_flag[ x0 ][ y0 ] &&~~ RefIdxSymL0 > −1 && RefIdxSymL1 > −1 ) | |
| sym_mvd_flag[ x0 ][ y0 ] | ae(v) |
| if( inter_pred_idc[ x0 ][ y0 ] != PRED_L1 ) { | |
| if( NumRefIdxActive[ 0 ] > 1 && !sym_mvd_flag[ x0 ][ y0 ] ) | |
| ref_idx_l0[ x0 ][ y0 ] | ae(v) |
| mvd_coding( x0, y0, 0, 0 ) | |
| if( MotionModelIdc[ x0 ][ y0 ] > 0 ) | |
| mvd_coding( x0, y0, 0, 1 ) | |
| if(MotionModelIdc[ x0 ][ y0 ] > 1 ) | |
| mvd_coding( x0, y0, 0, 2 ) | |
| if(MotionModelIdc[ x0 ][ y0 ] > 2 ) | |
| mvd_coding( x0, y0, 0, 3 ) | |
| mvp_l0_flag[ x0 ][ y0 ] | ae(v) |
| } else { | |
| MvdL0[ x0 ][ y0 ][ 0 ] = 0 | |
| MvdL0[ x0 ][ y0 ][ 1 ] = 0 | |
| } | |
| if( inter_pred_idc[ x0 ][ y0 ] != PRED_L0 ) { | |
| if( NumRefIdxActive[ 1 ] > 1 && !sym_mvd_flag[ x0 ][ y0 ] ) | |
| ref_idx_l1[ x0 ][ y0 ] | ae(v) |
| if( ph_mvd_l1_zero_flag && inter_pred_idc[ x0 ][ y0 ] = = PRED_BI ) { | |
| MvdL1[ x0 ][ y0 ][ 0 ] = 0 | |
| MvdL1[ x0 ][ y0 ][ 1 ] = 0 | |
| MvdCpL1[ x0 ][ y0 ][ 0 ][ 0 ] = 0 | |
| MvdCpL1[ x0 ][ y0 ][ 0 ][ 1 ] = 0 | |
| MvdCpL1[ x0 ][ y0 ][ 1 ][ 0 ] = 0 | |
| MvdCpL1[ x0 ][ y0 ][ 1 ][ 1 ] = 0 | |
| MvdCpL1[ x0 ][ y0 ][ 2 ][ 0 ] = 0 | |
| MvdCpL1[ x0 ][ y0 ][ 2 ][ 1 ] = 0 | |
| } else { | |
| if( sym_mvd_flag[ x0 ][ y0 ] ) { | |
| MvdL1[ x0 ][ y0 ][ 0 ] = −MvdL0[ x0 ][ y0 ][ 0 ] | |
| MvdL1[ x0 ][ y0 ][ 1 ] = −MvdL0[ x0 ][ y0 ][ 1 ] | |
| if( MotionModelIdc[ x0 ][ y0 ] > 0 ) { | |
| MvdCpL1[ x0 ][ y0 ][ 1 ][ 0 ] = −MvdCpL0[ x0 ][ y0 ][ 1 ][ 0 ] | |
| MvdCpL1[ x0 ][ y0 ][ 1 ][ 1 ] = −MvdCpL0[ x0 ][ y0 ][ 1 ][ 1 ] | |
| } | |
| if( MotionModelIdc[ x0 ][ y0 ] > 1 ) { | |
| MvdCpL1[ x0 ][ y0 ][ 2 ][ 0 ] = −MvdCpL0[ x0 ][ y0 ][ 2 ][ 0 ] | |
| MvdCpL1[ x0 ][ y0 ][ 2 ][ 1 ] = −MvdCpL0[ x0 ][ y0 ][ 2 ][ 1 ] | |
| } | |
| if( MotionModelIdc[ x0 ][ y0 ] > 2 ) { | |
| MvdCpL1[ x0 ][ y0 ][ 3 ][ 0 ] = −MvdCpL0[ x0 ][ y0 ][ 3 ][ 0 ] | |
| MvdCpL1[ x0 ][ y0 ][ 3 ][ 1 ] = −MvdCpL0[ x0 ][ y0 ][ 3 ][ 1 ] | |
| } | |
| } else { | |
| mvd_coding( x0, y0, 1, 0 ) | |
| if( MotionModelIdc[ x0 ][ y0 ] > 0 ) | |
| mvd_coding( x0, y0, 1, 1 ) | |
| if(MotionModelIdc[ x0 ][ y0 ] > 1 ) | |
| mvd_coding( x0, y0, 1, 2 ) | |
| if(MotionModelIdc[ x0 ][ y0 ] > 2 ) | |
| mvd_coding( x0, y0, 1, 3 ) | |
| } | |
| } | |
| mvp_l1_flag[ x0 ][ y0 ] | ae(v) |
| } else { | |
| MvdL1[ x0 ][ y0 ][ 0 ] = 0 | |
| MvdL1[ x0 ][ y0 ][ 1 ] = 0 | |
| } | |

Referring to Table 9, a decoding device may obtain an affine type index (cu_affine_type_idc) indicating an affine parameter type used for the current block among a plurality of affine parameter types. As an example, the affine type index may be defined as in Table 10 below.

TABLE 10

| |
|---|
| cu_affine_type_idc[ x0 ][ y0 ] equal to 1 specifies that for the current coding unit, when decoding a P or B slice, 6-parameter affine model based motion compensation is used to generate the prediction samples of the current coding unit. cu_affine_type_flag[ x0 ][ y0 ] equal to 0 specifies that 4-parameter affine model based motion compensation is used to generate the prediction samples of the current coding unit. When cu_affine_type_flag[ x0 ][ y0 ] is not present, it is inferred to be equal to 0. cu_affine_type_flag[ x0 ][ y0 ] equal to 2 specifies that 8-parameter affine model based motion compensation is used to generate the prediction samples of the current coding unit, when decoding a B slice and sym_mvd_flag is equal to true. |
| MotionModelIdc[ x ][ y ] represents motion model of a coding unit as illustrated in Table 15. The array indices x, y specify the luma sample location ( x, y ) relative to the top-left luma sample of the picture. |
| The variable MotionModelIdc[ x ][ y ] is derived as follows for x = x0..x0 + cbWidth − 1 and y = y0..y0 + cbHeight − 1: |
| - If general_merge_flag[ x0 ][ y0 ] is equal to 1, the following applies: MotionModelIdc[ x ][ y ] = merge_subblock_flag[ x0 ][ y0 ] (158) |
| - Otherwise (general_merge_flag[ x0 ][ y0 ] is equal to 0), the following applies: MotionModelIdc[ x ][ y ] = inter_affine_flag[ x0 ][ y0 ] + cu_affine_type_idc[ x0 ][ y0 ] (159) |

Referring to Table 10, an affine type index may indicate an affine type applied to a current block among a 4-parameter type, a 6-parameter type or a 8-parameter type. As described above, for a 8-parameter type, 4 control points are used and signaling data of a control point vector difference is large, so it may be indicated by an affine type index only when a SMVD is applied. Referring to Table 9 and Table 10, an affine type may have a value of 0, 1 and 2 and may indicate a 4-parameter, a 6-parameter and a 8-parameter, respectively.

In addition, as an example, a table as in Table 11 below may be defined.

TABLE 11

| | Motion model for motion compensation | |
|---|---|---|
| MotionModelIdc[ x ][ y ] | sym_mvd_flag == 0 | sym_mvd_flag == 1 |
| 0 | Translational motion | Translational motion |
| 1 | 4-parameter affine motion | 4-parameter affine motion |
| 2 | 6-parameter affine motion | 6-parameter affine motion |
| 3 | — | 8-parameter affine motion |

Referring to Table 11, when sym_mvd_flag is 0, a motion vector difference in both a L0 and L1 direction is signaled, so a 8-parameter type may not be used by considering the amount of bits. When sym_mvd_flag is 0, an affine type index may indicate only a 4-parameter type and a 6-parameter type. On the other hand, when sym_mvd_flag is 1, an affine type index may indicate all of a 4-parameter type, a 6-parameter type and a 8-parameter type. In other words, a range of an affine type index value may be variably determined based on a value of sym_mvd_flag. In other words, it may be indicated by an affine type index only when a 8-parameter SMVD flag indicates that a SMVD is used. In addition, in an embodiment, an affine type index may have a value of 0 or 1 regardless of sym_mvd_flag when a current slice is a P slice. When a current slice is a B slice and an affine SMVD is applied because a SMVD condition is satisfied, a value of 2 may be additionally applied.

When a SMVD is applied and an affine type index value is 2, a 8-parameter affine model may be applied. When it is determined as a 8-parameter, like the remaining control point vectors, a fourth control point vector difference of L1 may be derived as a mirrored fourth control point vector difference of L0. As an example, each control point vector of an affine block may be derived as in Equation 14 below.

$$CPMV_0 = CPMVP_0 + CPMVD_0 \quad \text{[Equation 14]}$$

$$CPMV_1 = CPMVP_1 + CPMVD_0 + CPMVD_1$$

$$CPMV_2 = CPMVP_2 + CPMVD_0 + CPMVD_2$$

$$CPMV_3 = CPMVP_3 + CPMVD_0 + CPMVD_3$$

Referring to Equation 14, since a motion vector differences between control point vectors has similarity, only a difference ($CPMVD_1$, $CPMVD_2$, $CPMVD_3$) between a motion vector difference ($CPMVD_0$) of a first control point (i.e., a control point at a top-left corner position) and a motion vector difference of a second control point (i.e., a control point at a top-right corner position), a third control point (i.e., a control point at a bottom-left corner position) and a fourth control point (i.e., a control point at a bottom-right corner position) may be signaled from an encoding device to a decoding device.

In other words, a first control point vector may be determined by adding a first control point vector predictor and a first control point vector difference, a second control point vector may be determined by adding a second control point vector predictor, a first control point vector difference and a second control point vector difference. and a third control point vector may be determined by adding a third control point vector predictor, a first control point vector difference and a third control point vector difference. In addition, a fourth control point vector may be determined by adding a fourth control point vector predictor, a first control point vector difference and a fourth control point vector difference.

As another example, a second control point vector and a third control point vector may have a similar motion vector difference because they are relatively closer to a first control point vector compared to a fourth control point vector. On the other hand, since a fourth control point vector is relatively far from a first control point vector, as in Equation 15 to Equation 18 below, a fourth control point vector may be derived by using a value other than a difference from a first control point vector difference, improving prediction efficiency. As an example, each control point vector of an affine block may be derived as in Equation 15 below.

$$CPMV_0 = CPMVP_0 + CPMVD_0 \quad \text{[Equation 15]}$$
$$CPMV_1 = CPMVP_1 + CPMVD_0 + CPMVD_1$$
$$CPMV_2 = CPMVP_2 + CPMVD_0 + CPMVD_2$$
$$CPMV_3 = CPMVP_3 + CPMVD_0 + CPMVD_2 + CPMVD_3$$

Referring to Equation 15, with similarity based on a degree of proximity between a fourth control point vector and a third control point vector, a fourth control point vector may be derived by using a first control point vector difference, a third control point vector difference and a fourth control point vector difference.

Alternatively, as an example, it may be modified and applied as in Equation 16 below.

$$CPMV_0 = CPMVP_0 + CPMVD_0 \quad \text{[Equation 16]}$$
$$CPMV_1 = CPMVP_1 + CPMVD_0 + CPMVD_1$$
$$CPMV_2 = CPMVP_2 + CPMVD_0 + CPMVD_2$$
$$CPMV_3 = CPMVP_3 + CPMVD_0 + CPMVD_1 + CPMVD_3$$

Referring to Equation 16, with similarity based on a degree of proximity between a fourth control point vector and a second control point vector, a fourth control point vector may be derived by using a first control point vector difference, a second control point vector difference and a fourth control point vector difference.

Alternatively, as an example, it may be modified and applied as in Equation 17 below.

$$CPMV_0 = CPMVP_0 + CPMVD_0 \quad \text{[Equation 17]}$$
$$CPMV_1 = CPMVP_1 + CPMVD_0 + CPMVD_1$$
$$CPMV_2 = CPMVP_2 + CPMVD_2$$
$$CPMV_3 = CPMVP_3 + CPMVD_2 + CPMVD_3$$

Referring to Equation 17, it may be an embodiment modified by assuming that a first control point vector and a second control point vector are similar and a third control point vector and a fourth control point vector are similar by pairing a similarity between control point vectors. In other words, a control point vector may be grouped into a first group including a first control point vector and a second control point vector and a second group including a third control point vector and a fourth control point vector. Considering a similarity per grouped control point vector, a control point vector difference may be signaled as in Equation 17. Specifically, since a similarity between a first control point vector and a third control point vector is low, a difference between two control point vectors may not be signaled, but each difference may be signaled. And, for a second control point vector and a fourth control point vector, a motion vector difference may be signaled by using a similarity with a first control point vector and a third control point vector, respectively.

Alternatively, as an example, it may be modified and applied as in Equation 18 below.

$$CPMV_0 = CPMVP_0 + CPMVD_0 \quad \text{[Equation 18]}$$
$$CPMV_1 = CPMVP_1 + CPMVD_1$$
$$CPMV_2 = CPMVP_2 + CPMVD_0 + CPMVD_2$$
$$CPMV_3 = CPMVP_3 + CPMVD_1 + CPMVD_3$$

Referring to Equation 18, it may be an embodiment modified by assuming that a first control point vector and a third control point vector are similar and a second control point vector and a fourth control point vector are similar by pairing a similarity between control point vectors. In other words, a control point vector may be grouped into a first group including a first control point vector and a third control point vector and a second group including a second control point vector and a fourth control point vector. Considering a similarity per grouped control point vector, a control point vector difference may be signaled as in Equation 18. Specifically, since a similarity between a first control point vector and a second control point vector is low, a difference between two control point vectors may not be signaled, but each difference may be signaled. And, for a third control point vector and a fourth control point vector, a motion vector difference may be signaled by using a similarity with a first control point vector and a second control point vector, respectively.

In addition, in an embodiment of the present disclosure, when a SMVD is applied to an affine block, a method of applying a SMVD only to some control points is described. As described above, a control point may be positioned at a top-left, top-right, bottom-left and bottom-right corner of a current block, a motion of an image and transform of an object may be symmetric or a motion and transform between each control point may be asymmetric. Accordingly, in order to improve coding efficiency in such cases, a SMVD may be applied only to some control points.

In an embodiment, for a 6-parameter type, whether to apply a SMVD may be signaled to a control point vector in a horizontal or vertical direction. In other words, as in Table 12 below, when a current affine type is a 6-parameter and a SMVD is applied, sym_dir_flag may be signaled additionally. For example, when sym_dir_flag is 0, a SMVD may be applied to a control point vector in a horizontal direction. As an example, when sym_dir_flag is 0, a SMVD may be applied to a first control point vector and a second control point vector. In addition, when sym_dir_flag is 1, a SMVD may be applied to a control point vector in a vertical direction. As an example, when sym_dir_flag is 1, a SMVD may be applied to a first control point and third control point vector. In addition, as an example, when a current affine type is a 4-parameter, sym_dir_flag may be inferred as 0.

TABLE 12

| | |
|---|---|
| if( sps_smvd_enabled_flag && !ph_mvd_l1_zero_flag && | |
| inter_pred_idc[ x0 ][ y0 ] = = PRED_BI && | |
| ~~!inter_affine_flag[ x0 ][ y0 ] &&~~ RefIdxSymL0 > −1 && RefIdxSymL1 > −1 ) | |
| sym_mvd_flag[ x0 ][ y0 ] | ae(v) |
| if( cu_affine_type_flag[ x0 ][ y0 ]&& sym_mvd_flag[ x0 ][ y0 ] ) | |
| sym_dir_flag[ x0 ][ y0 ] | |

More specifically, a control point vector determined based on sym_dir_flag may be derived as in Table 13 below. In other words, a SMVD may be applied to a second control point vector or a third control point vector or all bidirectional motion vectors may be signaled according to sym_dir_flag.

TABLE 13

| | |
|---|---|
| if( inter_pred_idc[ x0 ][ y0 ] != PRED_L1 ) { | |
| if( NumRefIdxActive[ 0 ] > 1 && !sym_mvd_flag[ x0 ][ y0 ] ) | |
| ref_idx_l0[ x0 ][ y0 ] | ae(v) |
| mvd_coding( x0, y0, 0, 0 ) | |
| if( MotionModelIdc[ x0 ][ y0 ] > 0 ) | |
| mvd_coding( x0, y0, 0, 1 ) | |
| if(MotionModelIdc[ x0 ][ y0 ] > 1 ) | |
| mvd_coding( x0, y0, 0, 2 ) | |
| mvp_l0_flag[ x0 ][ y0 ] | ae(v) |
| } else { | |
| MvdL0[ x0 ][ y0 ][ 0 ] = 0 | |
| MvdL0[ x0 ][ y0 ][ 1 ] = 0 | |
| } | |
| if( inter_pred_idc[ x0 ][ y0 ] != PRED_L0 ) { | |
| if( NumRefIdxActive[ 1 ] > 1 && !sym_mvd_flag[ x0 ][ y0 ] ) | |
| ref_idx_l1[ x0 ][ y0 ] | ae(v) |
| if( ph_mvd_l1_zero_flag && inter_pred_idc[ x0 ][ y0 ] = = PRED_BI ) { | |
| MvdL1[ x0 ][ y0 ][ 0 ] = 0 | |
| MvdL1[ x0 ][ y0 ][ 1 ] = 0 | |
| MvdCpL1[ x0 ][ y0 ][ 0 ][ 0 ] = 0 | |
| MvdCpL1[ x0 ][ y0 ][ 0 ][ 1 ] = 0 | |
| MvdCpL1[ x0 ][ y0 ][ 1 ][ 0 ] = 0 | |
| MvdCpL1[ x0 ][ y0 ][ 1 ][ 1 ] = 0 | |
| MvdCpL1[ x0 ][ y0 ][ 2 ][ 0 ] = 0 | |
| MvdCpL1[ x0 ][ y0 ][ 2 ][ 1 ] = 0 | |
| } else { | |
| if( sym_mvd_flag[ x0 ][ y0 ] ) { | |
| MvdL1[ x0 ][ y0 ][ 0 ] = −MvdL0[ x0 ][ y0 ][ 0 ] | |
| MvdL1[ x0 ][ y0 ][ 1 ] = −MvdL0[ x0 ][ y0 ][ 1 ] | |
| if( MotionModelIdc[ x0 ][ y0 ] > 0 ) { | |
| if( sym_dir_flag[ x0 ][ y0 ] == 0 ) { | |
| MvdCpL1[ x0 ][ y0 ][ 1 ][ 0 ] = −MvdCpL0[ x0 ][ y0 ][ 1 ][ 0 ] | |
| MvdCpL1[ x0 ][ y0 ][ 1 ][ 1 ] = −MvdCpL0[ x0 ][ y0 ][ 1 ][ 1 ] | |
| } else | |
| mvd_coding( x0, y0, 1, 1 ) | |
| } | |
| if( MotionModelIdc[ x0 ][ y0 ] > 1 ) { | |
| if( sym_dir_flag[ x0 ][ y0 ] == 1 ) { | |
| MvdCpL1[ x0 ][ y0 ][ 2 ][ 0 ] = −MvdCpL0[ x0 ][ y0 ][ 2 ][ 0 ] | |
| MvdCpL1[ x0 ][ y0 ][ 2 ][ 1 ] = −MvdCpL0[ x0 ][ y0 ][ 2 ][ 1 ] | |
| } else | |
| mvd_coding( x0, y0, 1, 2 ) | |
| } | |
| } else { | |
| mvd_coding( x0, y0, 1, 0 ) | |
| if( MotionModelIdc[ x0 ][ y0 ] > 0 ) | |
| mvd_coding( x0, y0, 1, 1 ) | |
| if(MotionModelIdc[ x0 ][ y0 ] > 1 ) | |
| mvd_coding( x0, y0, 1, 2 ) | |
| } | |
| mvp_l1_flag[ x0 ][ y0 ] | ae(v) |
| } else { | |
| MvdL1[ x0 ][ y0 ][ 0 ] = 0 | |
| MvdL1[ x0 ][ y0 ][ 1 ] = 0 | |
| } | |

Referring to Table 13, a SMVD may be applied to [a first control point vector, a second control point vector] or [a first control point vector, a third control point vector] according to sym_dir_flag.

Alternatively, as an embodiment, when a SMVD flag indicates that a SMVD is used, a syntax element indicating a control point set in which a SMVD is used among a plurality of control point sets may be signaled. As an example, the syntax element may be sym_dir_flag described previously in Table 12 and Table 13. As an example, the plurality of control point sets may include a first control point set and a second control point set. And, the first control point set may include a first control point corresponding to a top-left corner position of the current block and a second control point corresponding to a top-right corner position of the current block and the second control point set may include the first control point and a third control point corresponding to a bottom-left position of the current block.

The above-described embodiment may be applied substantially in the same way even when it is expanded to a 8-parameter. As an example, for a 8-parameter, sym_dir_flag may be signaled. When sym_dir_flag is 0, a SMVD may be applied to a first control point vector and a second control point vector. In addition, when sym_dir_flag is 1, a SMVD may be applied to a first control point vector and a third control point vector.

In addition, as an example, when a 8-parameter is applied, it may be modified and applied as follows. For example, sym_dir_flag may be signaled. When sym_dir_flag is 0, a SMVD may be applied to a first control point vector and a second control point vector. In addition, when sym_dir_flag is 0, a SMVD may be applied to a first control point vector and a third control point vector. It is an example for applying a SMVD only to some control point vectors, and a position and number of control point vectors to which a SMVD is applied may be changed.

In addition, as an example, a SMVD process described above for a block to which an affine model is applied may be performed when a predefined certain condition is satisfied. SMVD application to an affine block according to an embodiment described above may be controlled at a higher level. As an example, application may be controlled at a high level as follows, and it may be applied by using one of or in a combination of examples below. In the present disclosure, on/off control below may represent activation/deactivation control of a SMVD technology for an affine block at a corresponding level.

1) Whether to apply a SMVD for an affine block may be controlled on/off in a sequence parameter set (SPS).
2) Whether to apply a SMVD for an affine block may be controlled on/off in a picture parameter set (PPS).
3) Whether to apply a SMVD for an affine block may be controlled on/off in a picture header (PH).
4) Whether to apply a SMVD for an affine block may be controlled on/off in a slice header (SH).
5) Whether to apply A SMVD for an affine block may be controlled on/off in a SPS with the same syntax as whether to apply a SMVD for a non-affine block.
6) Whether to apply A SMVD for an affine block may be controlled on/off in a PPS with the same syntax as whether to apply a SMVD for a non-affine block.
7) Whether to apply A SMVD for an affine block may be controlled on/off in a PH with the same syntax as whether to apply a SMVD for a non-affine block.
8) Whether to apply A SMVD for an affine block may be controlled on/off in a SH with the same syntax as whether to apply a SMVD for a non-affine block.

In addition, as an example, when a SMVD is applied, a second control point vector difference (L1 CPMVD) for second direction (L1) prediction may be determined based on a first control point vector difference (L0 CPMVD) for first direction (L0) prediction. More specifically, when a SMVD is applied, a size of a second control point vector difference may be the same as a size of a first control point vector difference and a sign of a second control point vector difference may be opposite to a sign of a first control point vector difference.

In addition, when a SMVD is applied, information for coding a second control point vector difference and a reference picture index may not be signaled. A decoder may determine a second control point vector difference and a reference picture without signaling of a reference picture index and information for coding a second control point vector difference. A second control point vector difference may be determined based on a first control point vector difference, a first reference picture (a L0 reference picture) for first direction prediction may be determined as a previous reference picture closest to a current picture in display order in a first reference picture list (a L0 reference picture list) for first direction prediction and a second reference picture (a L1 reference picture) for second direction prediction may be determined as a subsequent picture closest to a current picture in the display order in a second reference picture list for second direction prediction.

Figure 12:
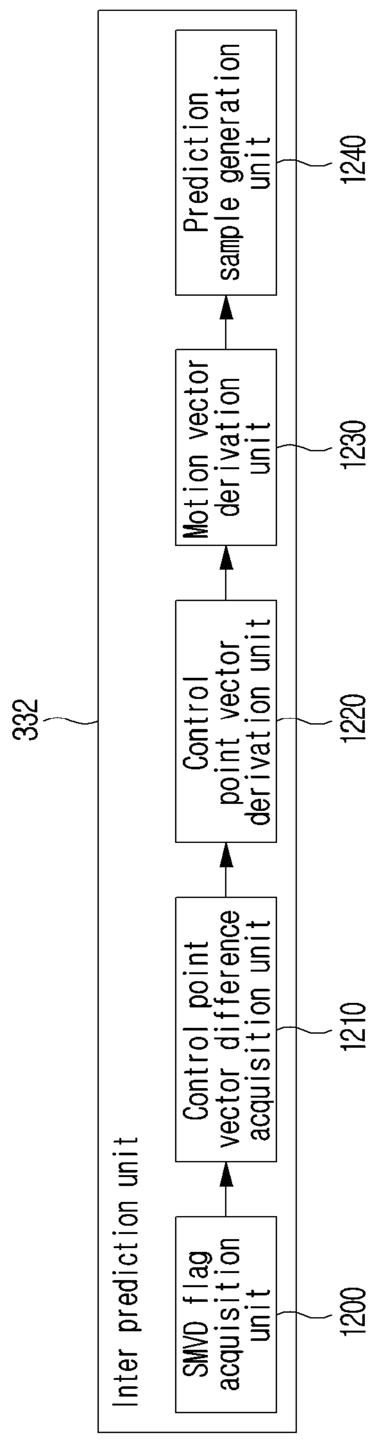
FIG. 12 shows a rough configuration of an inter prediction unit that performs an image decoding method according to an embodiment of the present disclosure.

FIG. 12 shows a rough configuration of an inter predictor 332 that performs an image decoding method according to an embodiment of the present disclosure.

Referring to FIG. 12, an inter predictor 332 may include a SMVD flag acquisition unit 1200, a control point vector difference acquisition unit 1210, a control point vector derivation unit 1220, a motion vector derivation unit 1230 and a prediction sample generation unit 1240.

A SMVD flag acquisition unit 1200 may obtain a flag indicating whether a SMVD is used for a current block. As an example, a current block may be a coding unit, a coding block, a transform unit, a transform block, a prediction unit or a prediction block. In addition, as an example, a current block may be a leaf node block in a tree-based block partition structure. In addition, in the present disclosure, the flag may be referred to as a symmetric motion vector difference flag or a SMVD flag, but of course, the flag is not limited thereto.

According to an embodiment of the present disclosure, a SMVD may be used for affine prediction to reduce signaling overhead caused by signaling a bidirectional motion vector difference per each control point and improve image compression performance. In other words, according to an embodiment of the present disclosure, a SMVD may be used to derive a bidirectional control point motion vector in affine prediction. Specifically, only a motion vector difference in any one direction may be signaled by using a symmetric feature of bidirectional prediction and a motion vector difference in another direction may be derived based on a signaled motion vector difference. Through this, the amount of signaling data for a motion vector difference may be reduced by half. In an embodiment, a method described above in FIG. 10 may be applied substantially in the same way in determining motion information of a control point.

A control point vector difference acquisition unit 1210 may obtain a control point vector difference of a current block based on a SMVD flag. A control point vector refers to a motion vector of a control point for an affine model, and may be defined for a corner position of a block (e.g., a position of at least one of a top-left, top-right, bottom-left or bottom-right corner). In the present disclosure, a control point vector may be referred to as a control point motion vector. In obtaining a control point vector difference, an embodiment described above in FIG. 11 may be equally applied.

As an example, when a SMVD is applied, i.e., when a SMVD flag indicates that a SMVD is used, a control point vector difference may be obtained by deriving a control point vector difference in a first direction based on a control point vector difference in a second direction. As an example, a control point vector difference in the first direction may be derived as a value whose size is the same as and sign is opposite to a control point vector difference in the second direction.

In the traditional technology (e.g., VVC), a SMVD is applied only to a non-affine block. However, according to an embodiment of the present disclosure, a SMVD may be applied even when a current block is an affine block, and as an example, a syntax as described above in Table 8 may be defined.

A control point vector derivation unit 1220 may derive ae control point vector of a current block based on an obtained control point vector difference. A control point vector derivation unit 1220 may derive a control point vector by adding a control point vector predictor to a control point vector difference. In order to derive a control point vector predictor, a candidate list including a plurality of affine candidates may be configured as previously described in FIG. 5.

An affine candidate used to derive a control point vector may be specified based on a candidate list and a candidate index. And, a control point vector predictor may be derived by using a specified affine candidate. In other words, as an example, a step of obtaining (or parsing) a candidate index from a bitstream may be added.

In addition, in an embodiment, each control point vector of an affine block may be calculated as in Equation 13 described above. In other words, since a motion vector difference between control point vectors has similarity, only a difference between a motion vector difference of a first control point (i.e., a control point at a top-left corner position) and a motion vector difference of a second control point (i.e., a control point at a top-right corner position) and a third control point (i.e., a control point at a bottom-left corner position) may be signaled from an encoding device to a decoding device. Alternatively, in another embodiment, each control point vector of an affine block may be calculated as in Equations 14 to 18 described above.

In a process of applying a SMVD of an affine block described in this embodiment, a first control point vector difference of L1 may be derived as a value that mirrors a first control point vector difference of L0 and a second control point vector difference and a third control point vector difference of L1 may be derived as a value that mirrors a second control point vector difference and a third control point vector difference of L0, respectively. In the present disclosure, mirroring may show a method of configuring (or determining, deriving) a value with the same size and an opposite sign.

A motion vector deriving unit 1230 may derive a motion vector of the current block based on a control point vector of a current block. A motion vector deriving unit 1230 may derive a motion vector in a unit of a sub-block or in a unit of a pixel within a current block based on a control point vector of a current block. In this case, an embodiment previously described in FIGS. 4 to 9 may be applied.

As an embodiment, a motion vector of a current block may be derived in a unit of a sub-block within the current block based on a control point vector of the current block. To this end, the current block may be partitioned into a plurality of N×M sub-blocks. Here, a N×M subblock may be rectangular (N>M or N<M, i.e., non-square) or square (N=M, i.e., square). The N and M value may be 4, 8, 16, 32 or more.

A prediction sample generation unit 1240 may generate a prediction sample of the current block by using a motion vector of a current block. A prediction sample generation unit 1240 may derive a motion vector based on a derived control point vector and generate a prediction sample based on a derived motion vector. In this case, an embodiment previously described in FIGS. 4 to 9 may be applied.

Figure 13:
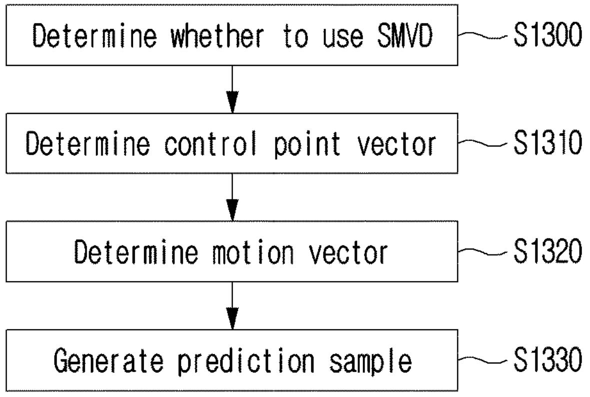
FIG. 13 shows an image encoding method performed by an encoding device according to an embodiment of the present disclosure.

FIG. 13 shows an image encoding method performed by an encoding device according to an embodiment of the present disclosure.

Hereinafter, an image decoding method described by referring to FIG. 11 may be applied equally/similarly to an image encoding method according to the present disclosure, and an overlapping description is omitted.

Referring to FIG. 13, an encoding device may determine whether a symmetric motion vector difference is used for a current block (S1300). As an example, a current block may be a coding unit, a coding block, a transform unit, a transform block, a prediction unit or a prediction block. In addition, as an example, a current block may be a leaf node block in a tree-based block partition structure.

According to an embodiment of the present disclosure, a SMVD may be used for affine prediction to reduce signaling overhead caused by signaling a bidirectional motion vector difference per each control point and improve image compression performance. In other words, according to an embodiment of the present disclosure, a SMVD may be used to derive a bidirectional control point motion vector in affine prediction. Specifically, only a motion vector difference in any one direction may be signaled by using a symmetric feature of bidirectional prediction and a motion vector difference in another direction may be derived based on a signaled motion vector difference. Through this, the amount of signaling data for a motion vector difference may be reduced by half. In an embodiment, a method described above in FIG. 10 may be applied substantially in the same way in determining motion information of a control point.

An encoding device may determine a control point vector of the current block (S1310). As an example, a control point vector difference of the current block may be encoded based on the control point vector and whether the symmetric motion vector difference is used. A control point vector refers to a motion vector of a control point for an affine model, and may be defined for a corner position of a block (e.g., a position of at least one of a top-left, top-right, bottom-left or bottom-right corner). In the present disclosure, a control point vector may be referred to as a control point motion vector. In obtaining a control point vector difference, an embodiment described above in FIG. 11 may be applied substantially in the same manner.

As an example, when a SMVD is applied, i.e., when a SMVD flag indicates that a SMVD is used, a control point vector difference may be determined based on a control point vector difference in a first direction and a control point vector difference in a second direction. As an example, a control point vector difference in the first direction may be determined as a value whose size is the same as and sign is opposite to that of a control point vector difference in the second direction.

In the traditional technology (e.g., VVC), a SMVD is applied only to a non-affine block. However, according to an embodiment of the present disclosure, a SMVD may be applied even when a current block is an affine block, and as an example, a syntax as described above in Table 8 may be defined.

An encoding device may determine a control point vector difference based on a control point vector of a current block. An encoding device may determine a control point vector difference by subtracting a control point vector predictor from a control point vector. In order to derive a control point vector predictor, a candidate list including a plurality of affine candidates may be configured as previously described in FIG. 5.

As an example, an affine candidate used to derive a control point vector may be specified based on a constructed candidate list. And, a candidate index specifying an affine candidate within a candidate list may be signaled by a decoding device. A control point vector predictor may be derived by using the specified affine candidate.

In addition, in an embodiment, each control point vector of an affine block may be calculated as in Equation 13 described above. In other words, since a motion vector difference between control point vectors has similarity, only a difference between a motion vector difference of a first control point (i.e., a control point at a top-left corner position) and a motion vector difference of a second control point (i.e., a control point at a top-right corner position) and a third control point (i.e., a control point at a bottom-left corner position) may be signaled from an encoding device to a decoding device. Alternatively, in another embodiment, each control point vector of an affine block may be calculated as in Equations 14 to 18 described above.

In a process of applying a SMVD of an affine block described in this embodiment, a first control point vector difference of L1 may be derived as a value that mirrors a first control point vector difference of L0 and a second control point vector difference and a third control point vector difference of L1 may be derived as a value that mirrors a second control point vector difference and a third control point vector difference of L0, respectively. In the present disclosure, mirroring may show a method of configuring (or determining, deriving) a value with the same size and an opposite sign.

An encoding device may determine a motion vector of the current block based on a control point vector (S1320). An encoding device may determine a motion vector of the current block based on a control point vector of a current block. An encoding device may determine a motion vector in a unit of a sub-block or in a unit of a pixel within a current block based on a control point vector of a current block. In this case, an embodiment previously described in FIGS. 4 to 9 may be applied.

As an example, a motion vector of a current block may be determined in a unit of a sub-block within the current block based on a control point vector of the current block. To this end, the current block may be partitioned into a plurality of N×M sub-blocks. Here, a N×M subblock may be rectangular (N>M or N<M, i.e., non-square) or square (N=M, i.e., square). The N and M value may be 4, 8, 16, 32 or more.

An encoding device may generate a prediction sample of the current block by using the motion vector (S1330). An encoding device may determine a motion vector based on a determined control point vector and generate a prediction sample based on a determined motion vector. In this case, an embodiment previously described in FIGS. 4 to 9 may be applied.

Figure 14:
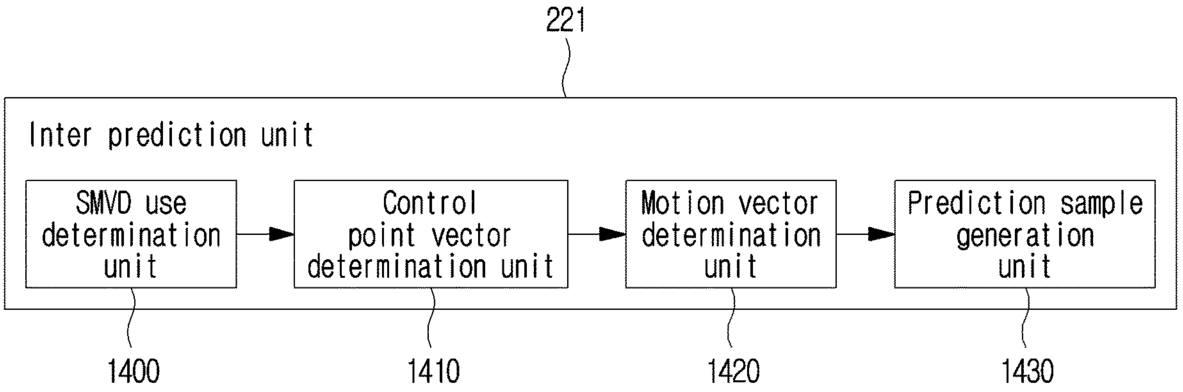
FIG. 14 shows a rough configuration of an inter prediction unit that performs an image encoding method according to an embodiment of the present disclosure.

FIG. 14 shows a rough configuration of an inter predictor 221 that performs an image encoding method according to an embodiment of the present disclosure.

Referring to FIG. 14, an inter predictor 221 may include a SMVD use determination unit 1400, a control point vector determination unit 1410, a motion vector determination unit 1420 and a prediction sample generation unit 1430.

A SMVD use determination unit 1400 may determine whether a symmetric motion vector difference is used for a current block. As an example, a current block may be a coding unit, a coding block, a transform unit, a transform block, a prediction unit or a prediction block. In addition, as an example, a current block may be a leaf node block in a tree-based block partition structure.

According to an embodiment of the present disclosure, a SMVD may be used for affine prediction to reduce signaling overhead caused by signaling a bidirectional motion vector difference per each control point and improve image compression performance. In other words, according to an embodiment of the present disclosure, a SMVD may be used to derive a bidirectional control point motion vector in affine prediction. Specifically, only a motion vector difference in any one direction may be signaled by using a symmetric feature of bidirectional prediction and a motion vector difference in another direction may be derived based on a signaled motion vector difference. Through this, the amount of signaling data for a motion vector difference may be reduced by half. In an embodiment, a method described above in FIG. 10 may be applied substantially in the same way in determining motion information of a control point.

A control point vector determination unit 1410 may determine a control point vector of the current block. As an example, a control point vector difference of the current block may be encoded based on the control point vector and whether the symmetric motion vector difference is used. A control point vector refers to a motion vector of a control point for an affine model, and may be defined for a corner position of a block (e.g., a position of at least one of a top-left, top-right, bottom-left or bottom-right corner). In the present disclosure, a control point vector may be referred to as a control point motion vector. In obtaining a control point vector difference, an embodiment described above in FIG. 11 may be applied substantially in the same manner.

As an example, when a SMVD is applied, i.e., when a SMVD flag indicates that a SMVD is used, a control point vector difference may be determined based on a control point vector difference in a first direction and a control point vector difference in a second direction. As an example, a control point vector difference in the first direction may be determined as a value whose size is the same as and sign is opposite to that of a control point vector difference in the second direction.

In the traditional technology (e.g., VVC), a SMVD is applied only to a non-affine block. However, according to an embodiment of the present disclosure, a SMVD may be applied even when a current block is an affine block, and as an example, a syntax as described above in Table 8 may be defined.

An encoding device may determine a control point vector difference based on a control point vector of a current block. An encoding device may determine a control point vector difference by subtracting a control point vector predictor from a control point vector. In order to derive a control point vector predictor, a candidate list including a plurality of affine candidates may be configured as previously described in FIG. 5.

As an example, an affine candidate used to derive a control point vector may be specified based on a constructed candidate list. And, a candidate index specifying an affine candidate within a candidate list may be signaled by a decoding device. A control point vector predictor may be derived by using the specified affine candidate.

In addition, in an embodiment, each control point vector of an affine block may be calculated as in Equation 13 described above. In other words, since a motion vector difference between control point vectors has similarity, only a difference between a motion vector difference of a first control point (i.e., a control point at a top-left corner position) and a motion vector difference of a second control point (i.e., a control point at a top-right corner position) and a third control point (i.e., a control point at a bottom-left corner position) may be signaled from an encoding device to a decoding device. Alternatively, in another embodiment, each control point vector of an affine block may be calculated as in Equations 14 to 18 described above.

In a process of applying a SMVD of an affine block described in this embodiment, a first control point vector difference of L1 may be derived as a value that mirrors a first control point vector difference of L0 and a second control point vector difference and a third control point vector difference of L1 may be derived as a value that mirrors a second control point vector difference and a third control point vector difference of L0, respectively. In the present disclosure, mirroring may show a method of configuring (or determining, deriving) a value with the same size and an opposite sign.

A motion vector determination unit 1420 may determine a motion vector of the current block based on the control point vector. A motion vector determination unit 1420 may determine a motion vector of the current block based on a control point vector of a current block. A motion vector determination unit 1420 may determine a motion vector in a unit of a sub-block or in a unit of a pixel within a current block based on a control point vector of a current block. In this case, an embodiment previously described in FIGS. 4 to 9 may be applied.

As an example, a motion vector of a current block may be determined in a unit of a sub-block within the current block based on a control point vector of the current block. To this end, the current block may be partitioned into a plurality of N×M sub-blocks. Here, a N×M subblock may be rectangular (N>M or N<M, i.e., non-square) or square (N=M, i.e., square). The N and M value may be 4, 8, 16, 32 or more.

A prediction sample generation unit 1430 may generate a prediction sample of the current block by using the motion vector. A prediction sample generation unit 1430 may determine a motion vector based on a determined control point vector and generate a prediction sample based on a determined motion vector. In this case, an embodiment previously described in FIGS. 4 to 9 may be applied.

In the above-described embodiment, methods are described based on a flowchart as a series of steps or blocks, but a corresponding embodiment is not limited to the order of steps, and some steps may occur simultaneously or in different order with other steps as described above. In addition, those skilled in the art may understand that steps shown in a flowchart are not exclusive, and that other steps may be included or one or more steps in a flowchart may be deleted without affecting the scope of embodiments of the present disclosure.

The above-described method according to embodiments of the present disclosure may be implemented in a form of software, and an encoding device and/or a decoding device according to the present disclosure may be included in a device which performs image processing such as a TV, a computer, a smartphone, a set top box, a display device, etc.

In the present disclosure, when embodiments are implemented as software, the above-described method may be implemented as a module (a process, a function, etc.) that performs the above-described function. A module may be stored in a memory and may be executed by a processor. A memory may be internal or external to a processor, and may be connected to a processor by a variety of well-known means. A processor may include an application-specific integrated circuit (ASIC), another chipset, a logic circuit and/or a data processing device. A memory may include a read-only memory (ROM), a random access memory (RAM), a flash memory, a memory card, a storage medium and/or another storage device. In other words, embodiments described herein may be performed by being implemented on a processor, a microprocessor, a controller or a chip. For example, functional units shown in each drawing may be performed by being implemented on a computer, a processor, a microprocessor, a controller or a chip. In this case, information for implementation (ex. information on instructions) or an algorithm may be stored in a digital storage medium.

In addition, a decoding device and an encoding device to which embodiment(s) of the present disclosure are applied may be included in a multimedia broadcasting transmission and reception device, a mobile communication terminal, a home cinema video device, a digital cinema video device, a surveillance camera, a video conversation device, a real-time communication device like a video communication, a mobile streaming device, a storage medium, a camcorder, a device for providing video on demand (VOD) service, an over the top video (OTT) device, a device for providing Internet streaming service, a three-dimensional (3D) video device, a virtual reality (VR) device, an argument reality (AR) device, a video phone video device, a transportation terminal (ex. a vehicle (including an autonomous vehicle) terminal, an airplane terminal, a ship terminal, etc.) and a medical video device, etc., and may be used to process a video signal or a data signal. For example, an over the top video (OTT) device may include a game console, a blu-ray player, an Internet-connected TV, a home theater system, a smartphone, a tablet PC, a digital video recorder (DVR), etc.

In addition, a processing method to which embodiment(s) of the present disclosure are applied may be produced in a form of a program executed by a computer and may be stored in a computer-readable recording medium. Multimedia data having a data structure according to embodiment(s) of the present disclosure may be also stored in a computer-readable recording medium. The computer-readable recording medium includes all types of storage devices and distributed storage devices that store computer-readable data. The computer-readable recording medium may include, for example, a blu-ray disk (BD), an universal serial bus (USB), ROM, PROM, EPROM, EEPROM, RAM, CD-ROM, a magnetic tape, a floppy disk and an optical media storage device. In addition, the computer-readable recording medium includes media implemented in a form of a carrier wave (e.g., transmission via the Internet). In addition, a bitstream generated by an encoding method may be stored in a computer-readable recording medium or may be transmitted through a wired or wireless communication network.

In addition, embodiment(s) of the present disclosure may be implemented by a computer program product by a program code, and the program code may be executed on a computer by embodiment(s) of the present disclosure. The program code may be stored on a computer-readable carrier.

Figure 15:
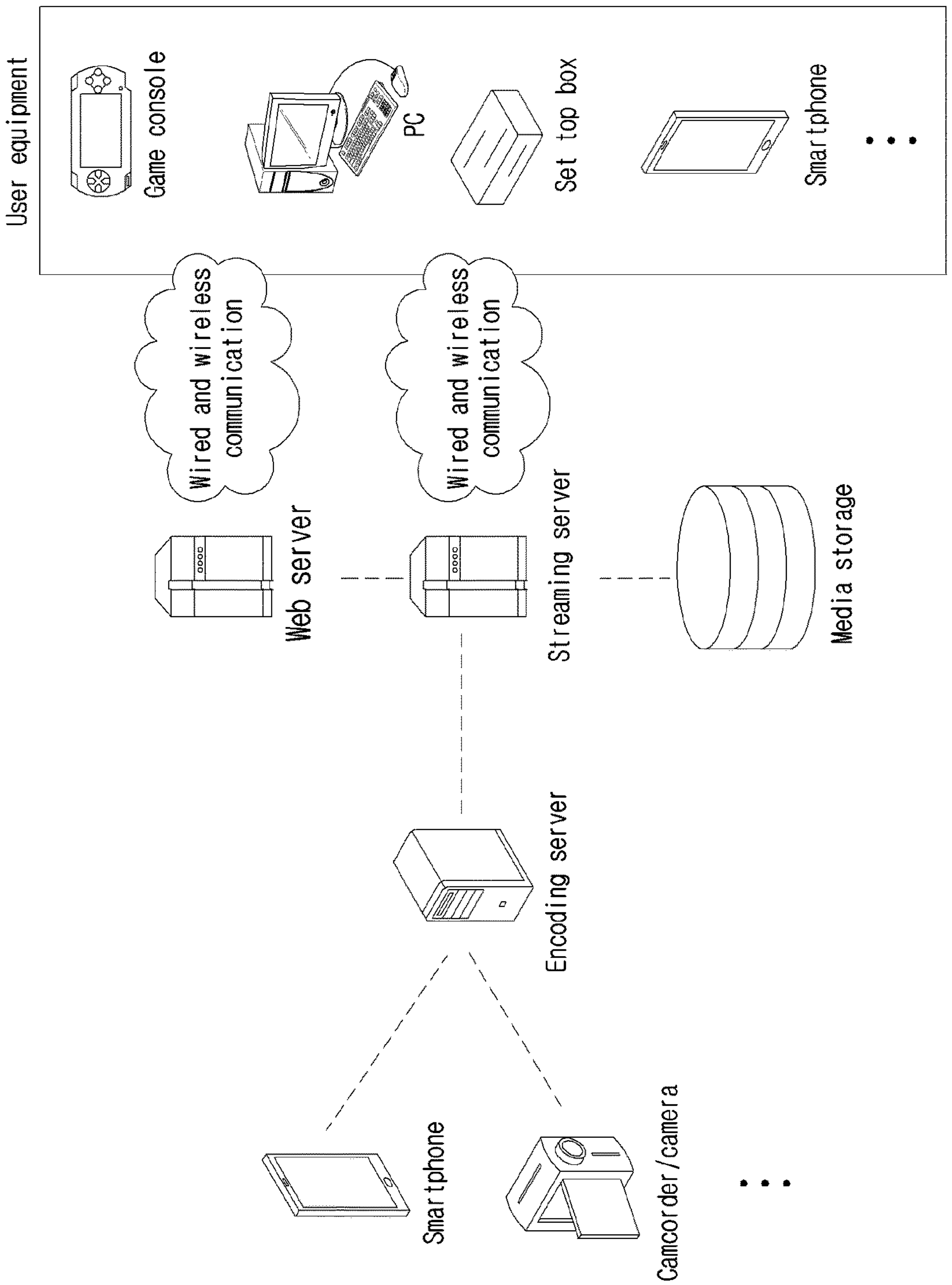
FIG. 15 shows an example of a contents streaming system to which embodiments of the present disclosure may be applied.

FIG. 15 shows an example of a contents streaming system to which embodiments of the present disclosure may be applied.

Referring to FIG. 15, a contents streaming system to which embodiment(s) of the present disclosure are applied may largely include an encoding server, a streaming server, a web server, a media storage, a user device and a multimedia input device.

The encoding server generates a bitstream by compressing contents input from multimedia input devices such as a smartphone, a camera, a camcorder, etc. into digital data and transmits it to the streaming server. As another example, when multimedia input devices such as a smartphone, a camera, a camcorder, etc. directly generate a bitstream, the encoding server may be omitted.

The bitstream may be generated by an encoding method or a bitstream generation method to which embodiment(s) of the present disclosure are applied, and the streaming server may temporarily store the bitstream in a process of transmitting or receiving the bitstream.

The streaming server transmits multimedia data to a user device based on a user's request through a web server, and the web server serves as a medium to inform a user of what service is available. When a user requests desired service from the web server, the web server delivers it to a streaming server, and the streaming server transmits multimedia data to a user. In this case, the contents streaming system may include a separate control server, and in this case, the control server controls a command/a response between each device in the content streaming system.

The streaming server may receive contents from a media storage and/or an encoding server. For example, when contents is received from the encoding server, the contents may be received in real time. In this case, in order to provide smooth streaming service, the streaming server may store the bitstream for a certain period of time.

An example of the user device may include a mobile phone, a smart phone, a laptop computer, a digital broadcasting terminal, a personal digital assistants (PDAs), a portable multimedia players (PMP), a navigation, a slate PC, a Tablet PC, an ultrabook, a wearable device (e.g., a smartwatch, a smart glass, a head mounted display (HMD), a digital TV, a desktop, a digital signage, etc.

Each server in the contents streaming system may be operated as a distributed server, and in this case, data received from each server may be distributed and processed.

The claims set forth herein may be combined in various ways. For example, a technical characteristic of a method claim of the present disclosure may be combined and implemented as a device, and a technical characteristic of a device claim of the present disclosure may be combined and implemented as a method. In addition, a technical characteristic of a method claim of the present disclosure and a technical characteristic of a device claim may be combined and implemented as a device, and a technical characteristic of a method claim of the present disclosure and a technical characteristic of a device claim may be combined and implemented as a method.

The invention claimed is:

1. An image decoding method, the method comprising:

obtaining an inter affine flag from a bitstream, wherein the inter affine flag indicates whether an affine model based inter prediction is used for a current block;

obtaining a first flag from the bitstream, wherein the first flag indicates whether a symmetric motion vector difference is used for the current block based on a bi-prediction being used for the current block;

obtaining a control point motion vector difference of the current block from the bitstream based on the first flag and the inter affine flag;

deriving a control point motion vector of the current block based on a control point motion vector predictor and the control point motion vector difference;

deriving a motion vector of the current block based on the control point motion vector; and generating a prediction sample of the current block by using the motion vector, wherein based on the first flag indicating that the symmetric motion vector difference is used, a control point motion vector difference of a first direction for the control point motion vector difference is derived by applying an opposite sign to a control point motion vector difference of a second direction for the control point motion vector difference.

2. The method of claim 1, wherein:

the control point motion vector includes at least two of a first control point motion vector of a first control point corresponding to a top-left corner position of the current block, a second control point motion vector of a second control point corresponding to a top-right corner position of the current block, a third control point motion vector of a third control point corresponding to a bottom-left corner position of the current block or a fourth control point motion vector of a fourth control point corresponding to a bottom-right corner position of the current block.

3. The method of claim 2, wherein:

the fourth control point motion vector is derived based on a control point motion vector predictor of the fourth control point, a control point motion vector difference of the first control point and a control point motion vector difference of the fourth control point.

4. The method of claim 2, wherein:

the fourth control point motion vector is derived based on a control point motion vector predictor of the fourth control point, a control point motion vector difference of the first control point, a control point motion vector difference of the second control point and a control point motion vector difference of the fourth control point.

5. The method of claim 2, wherein:

the fourth control point motion vector is derived based on a control point motion vector predictor of the fourth control point, a control point motion vector difference of the first control point, a control point motion vector difference of the third control point and a control point motion vector difference of the fourth control point.

6. The method of claim 2, wherein:

the fourth control point motion vector is derived by using any one of a control point motion vector predictor of the fourth control point, a control point motion vector difference of the first control point and a control point motion vector difference of the second control point.

7. The method of claim 1, wherein:

the control point motion vector difference in the first direction is derived as a value whose size is a same as and sign is opposite to the control point motion vector difference in the second direction.

8. The method of claim 1, further comprising:

acquiring an index indicating an affine parameter type used for the current block among a plurality of affine parameter types, wherein the plurality of affine parameter types include at least one of a 4 parameter type, a 6-parameter type or a 8-parameter type.

9. The method of claim 8, wherein:

the 8-parameter type is indicated by the index only when the first flag indicates that the symmetric motion vector difference is used.

10. The method of claim 1, further comprising:

obtaining a second flag indicating a control point set that the symmetric motion vector difference is used among a plurality of control point sets from the bitstream based on the first flag indicating that the symmetric motion vector difference is used, and wherein each of the plurality of control point sets includes one or more control points of the current block.

11. The method of claim 10, wherein:

the plurality of control point sets include a first control point set and a second control point set, the first control point set includes a first control point corresponding to a top left corner position of the current block and a second control point corresponding to a top-right corner position of the current block, the second control point set includes the first control point and a third control point corresponding to a bottom-left corner position of the current block.

12. The method of claim 1, further comprising:

acquiring a third flag indicating whether a symmetric motion vector difference for affine prediction is activated, wherein the third flag is signaled through at least one of a sequence parameter set (SPS), a picture parameter set (PPS), a picture header (PH), or a slice header (SH).

13. An image encoding method, the method comprising:

determining whether an affine model based inter prediction is used for a current block;

determining whether a symmetric motion vector difference is used for the current block based on a bi-prediction being used for the current block;

determining a control point motion vector of the current block;

determining a motion vector of the current block based on the control point motion vector; and generating a prediction sample of the current block by using the motion vector, wherein a control point motion vector difference of the current block is encoded based on whether an affine model based inter prediction is used for the current block, whether the symmetric motion vector difference is used and the control point motion vector, wherein based on a first flag indicating that the symmetric motion vector difference is used, a control point motion vector difference of a first direction for the control point motion vector difference is derived by applying an opposite sign to a control point motion vector difference of a second direction for the control point motion vector difference.

14. A method of transmitting data for image information, the method comprising:

generating a bitstream for the image information, wherein the bitstream is generated based on determining whether an affine model based inter prediction is used for a current block, determining whether a symmetric motion vector difference is used for the current block based on a bi-prediction being used for the current block, determining a control point motion vector of the current block, determining a motion vector of the current block based on the control point motion vector, and generating a prediction sample of the current block by using the motion vector;

transmitting the data including the bitstream, wherein a control point motion vector difference of the current block is encoded based on whether an affine model based inter prediction is used for the current block, whether the symmetric motion vector difference is used and the control point motion vector, wherein based on a first flag indicating that the symmetric motion vector difference is used, a control point motion vector difference of a first direction for the control point motion vector difference is derived by applying an opposite sign to a control point motion vector difference of a second direction for the control point motion vector difference.

* * * * *